(12) United States Patent
Fetherston

(10) Patent No.: US 11,431,231 B2
(45) Date of Patent: Aug. 30, 2022

(54) CABLE-ACTUATED POSITION SENSORS AND GEAR MOTORS

(71) Applicant: Shaun William Fetherston, Trabuco Canyon, CA (US)

(72) Inventor: Shaun William Fetherston, Trabuco Canyon, CA (US)

(*) Notice: Subject to any disclaimer, the term of this patent is extended or adjusted under 35 U.S.C. 154(b) by 241 days.

(21) Appl. No.: 16/792,027

(22) Filed: Feb. 14, 2020

(65) Prior Publication Data
US 2020/0266688 A1 Aug. 20, 2020

Related U.S. Application Data

(60) Provisional application No. 62/843,174, filed on May 3, 2019, provisional application No. 62/806,406, filed on Feb. 15, 2019.

(51) Int. Cl.
| | |
|---|---|
| *H02K 11/23* | (2016.01) |
| *H02K 7/116* | (2006.01) |
| *H02K 7/10* | (2006.01) |
| *F16H 19/06* | (2006.01) |
| *G01B 7/02* | (2006.01) |
| *G01B 7/30* | (2006.01) |

(52) U.S. Cl.
CPC ............. *H02K 11/23* (2016.01); *F16H 19/06* (2013.01); *G01B 7/026* (2013.01); *G01B 7/30* (2013.01); *H02K 7/1004* (2013.01); *H02K 7/116* (2013.01)

(58) Field of Classification Search
CPC ................................ H02K 11/13; H02K 7/116
USPC .................................................. 310/68 E, 83
See application file for complete search history.

(56) References Cited

U.S. PATENT DOCUMENTS

| | | |
|---|---|---|
| 4,057,904 A | 11/1977 | Vrabel et al. |
| 4,914,368 A | 4/1990 | Orton |
| 5,122,720 A | 6/1992 | Martinson et al. |
| 5,765,337 A | 6/1998 | Lodewegen et al. |
| 6,574,492 B1 | 6/2003 | Ben-Haim et al. |
| 7,040,457 B1 | 5/2006 | Bene' |
| 7,263,782 B2 | 9/2007 | Steinich |
| 7,819,158 B2 | 10/2010 | Klinstein et al. |
| 8,146,886 B2 | 4/2012 | Hanlon et al. |
| 8,255,093 B2 | 8/2012 | Layton et al. |
| 9,234,735 B2 | 1/2016 | Glasson |
| 9,636,455 B2 | 5/2017 | Kamen et al. |
| 9,822,574 B2 | 11/2017 | Heiberger et al. |
| 9,933,088 B2 | 4/2018 | Smith et al. |
| 2008/0000317 A1* | 1/2008 | Patton ................. F16H 19/06 623/32 |
| 2009/0127527 A1* | 5/2009 | Hoffend, III ........... B66D 1/74 242/615 |

(Continued)

FOREIGN PATENT DOCUMENTS

| | | |
|---|---|---|
| CN | 103575308 | 2/2014 |
| CN | 203621570 | 6/2014 |

(Continued)

*Primary Examiner* — Jose A Gonzalez Quinones
(74) *Attorney, Agent, or Firm* — Chang & Hale LLP

(57) ABSTRACT

Cable-actuated position sensors are described that employ multiple block and tackle arrangements to measure displacement of a draw wire or flexible cable. The disclosed sensors are relatively small and inexpensive. The disclosed sensors may also be used as part of a servo motor, or in conjunction with gear motors to provide positional information for operation of the gear motor.

15 Claims, 21 Drawing Sheets

(56) References Cited

U.S. PATENT DOCUMENTS

| | | | |
|---|---|---|---|
| 2010/0269273 A1 | 10/2010 | Proffitt et al. | |
| 2012/0319850 A1 | 12/2012 | Welch et al. | |
| 2014/0000411 A1* | 1/2014 | Shelton, IV | A61B 34/30 74/650 |
| 2014/0092239 A1 | 4/2014 | Pelczynski | |
| 2014/0094106 A1 | 4/2014 | McIlhany | |
| 2014/0277697 A1 | 9/2014 | McDonald et al. | |
| 2014/0309882 A1 | 10/2014 | Antchak et al. | |
| 2015/0122043 A1 | 5/2015 | Xu et al. | |
| 2016/0166460 A1 | 6/2016 | Murphy et al. | |
| 2016/0271452 A1 | 9/2016 | Lagree | |
| 2018/0021616 A1* | 1/2018 | Orady | A63B 21/4035 482/5 |
| 2019/0085955 A1 | 3/2019 | Sardi | |

FOREIGN PATENT DOCUMENTS

| | | |
|---|---|---|
| CN | 102829742 | 2/2015 |
| CN | 106717369 | 5/2017 |

* cited by examiner

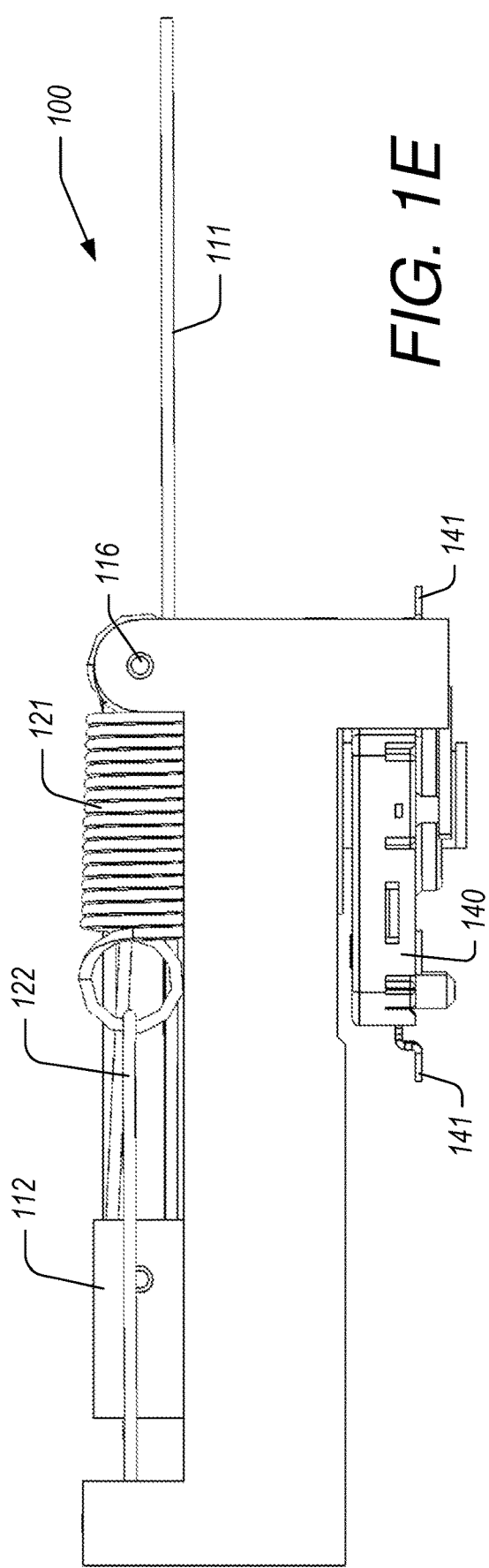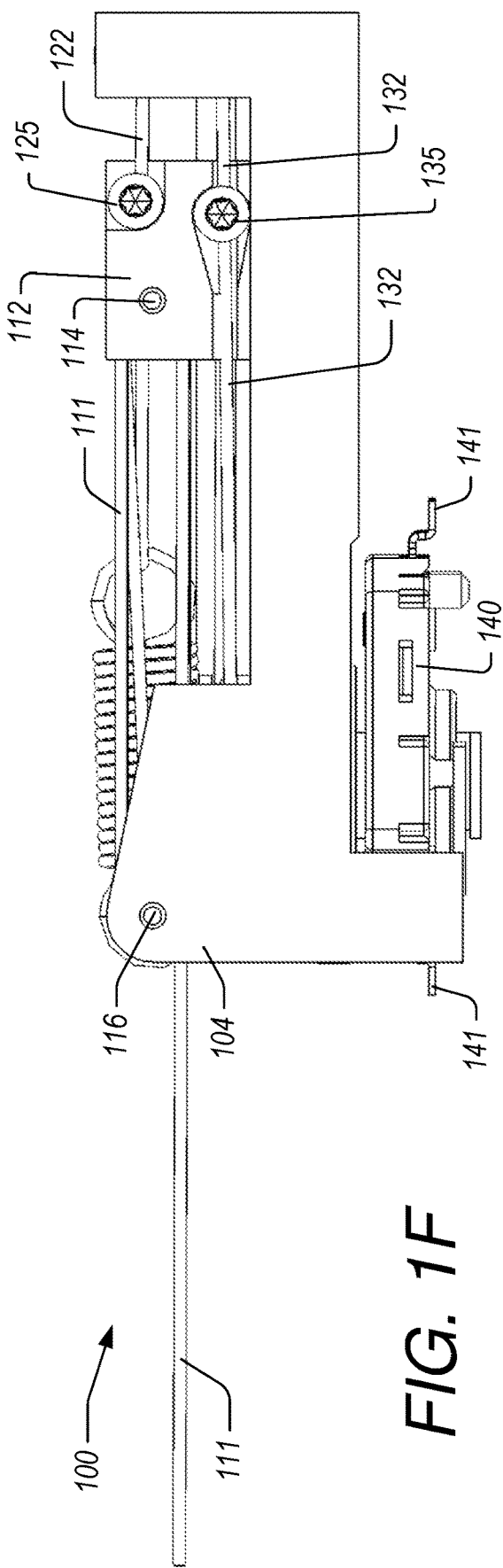

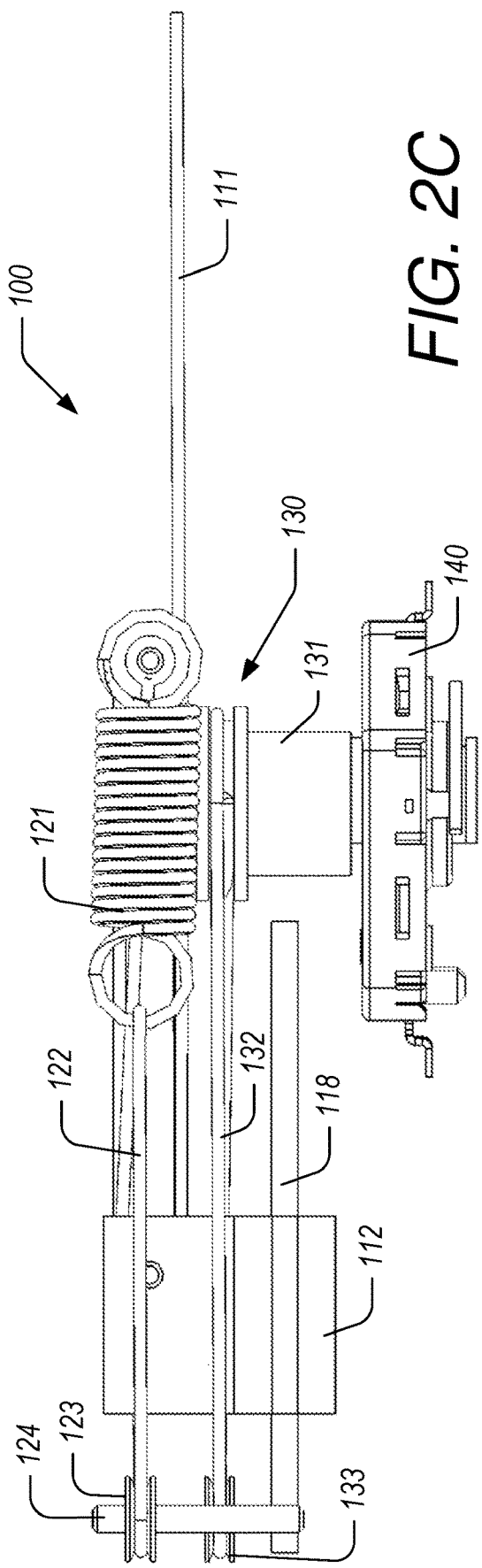
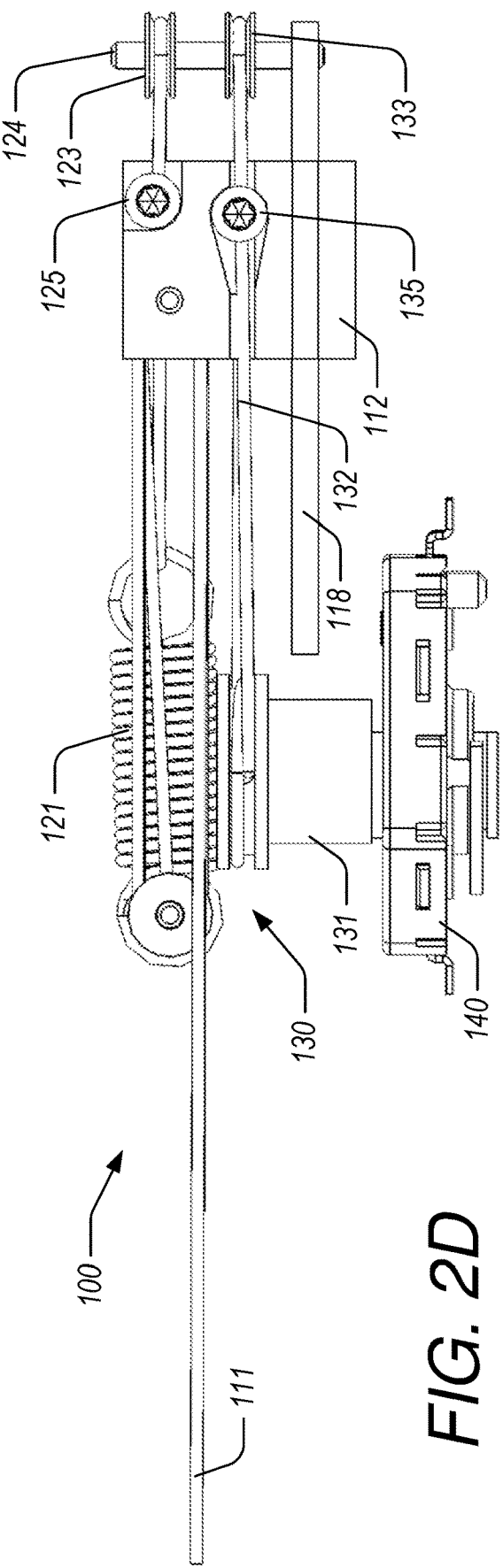
FIG. 2C
FIG. 2D

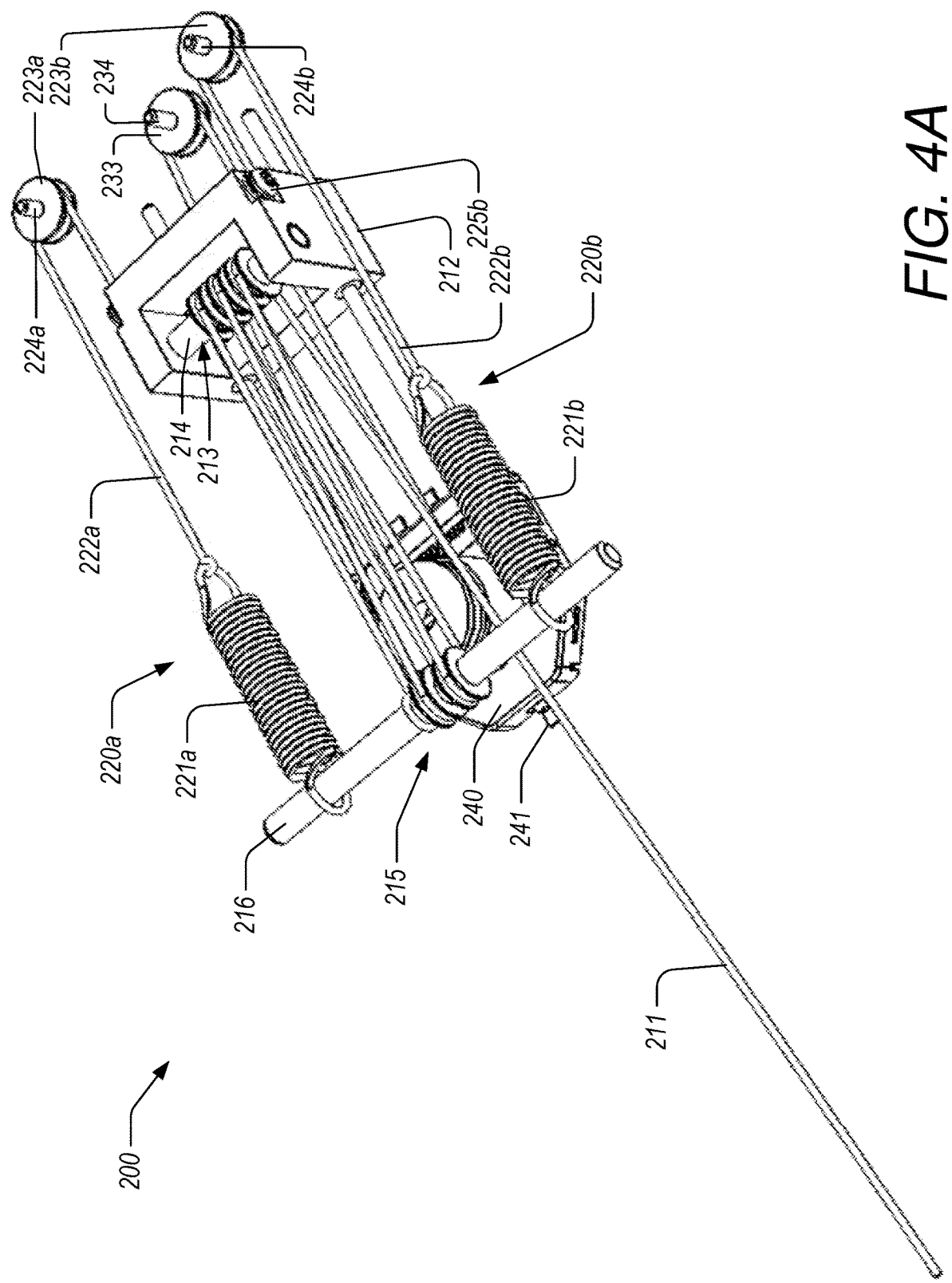

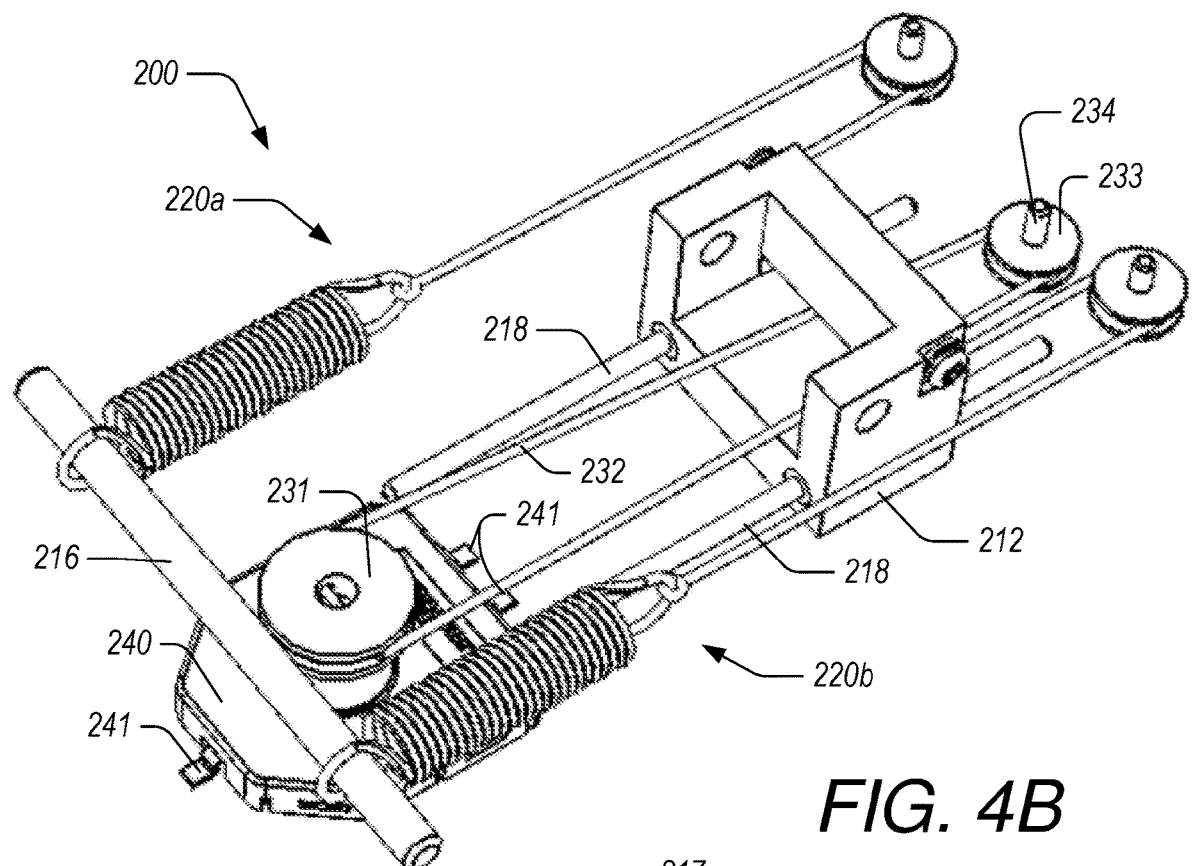
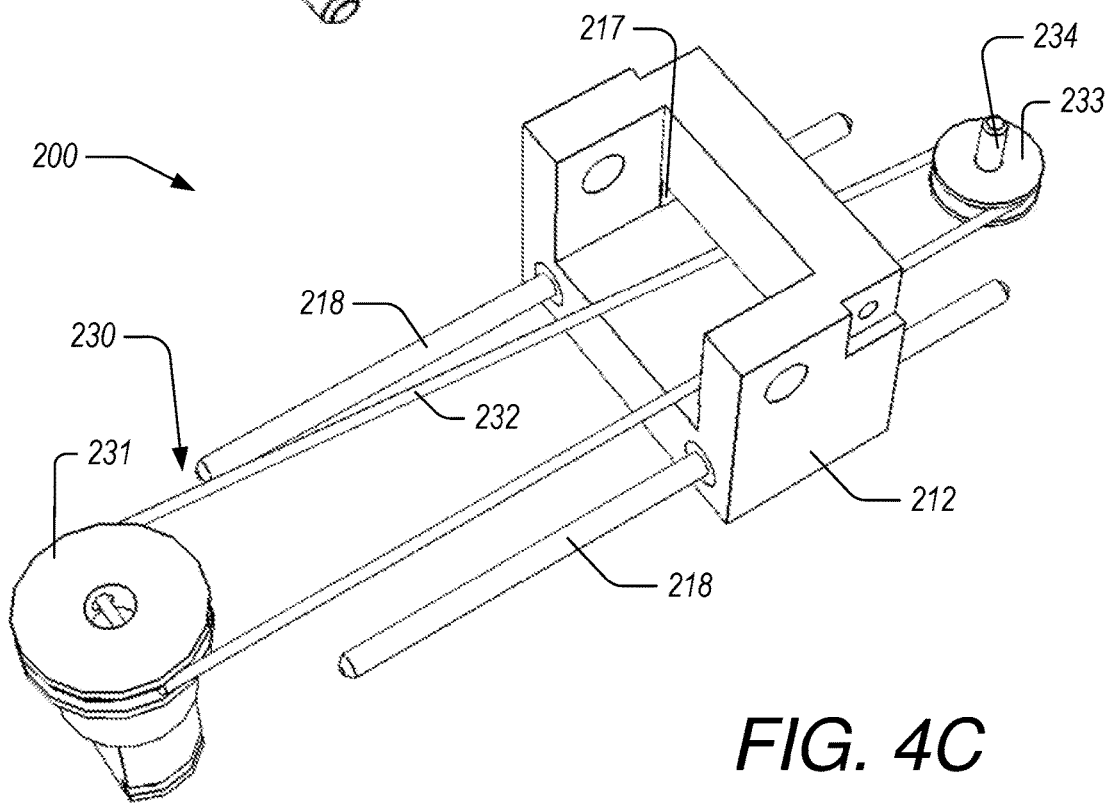

CABLE-ACTUATED POSITION SENSORS AND GEAR MOTORS

CROSS-REFERENCE TO RELATED APPLICATIONS

This application claims priority to U.S. Prov. App. Nos. 62/806,406 filed Feb. 15, 2019 and entitled "CABLE-ACTUATED POSITION SENSORS," and 62/843,174 filed May 3, 2019 and entitled "GEAR MOTOR WITH OUTPUT SHAFT POSITION SENSING," each of which is expressly incorporated by reference herein in its entirety for all purposes.

BACKGROUND

Field

The present disclosure generally relates to cable-actuated position sensors and to gear motors incorporating such sensors.

Description of Related Art

Position sensors can be used to measure the position and/or speed of a movable object. A cable actuated position sensor is a particular implementation of a position sensor that is designed to convert the movement of a cable into an electrical signal. Typically, the position sensor is mounted in a fixed position relative to the movable object and the cable is actuated due to movement of the object. In response to the movement, the cable extracts or retracts under the power of an internal, engineered spring which also maintains tension on the displacement cable throughout its stroke. An internal sensor produces an electrical output relative to the movement of the cable thereby giving an indication of movement of the object.

Position sensors can be used in conjunction with gear motors and servo motors to provide feedback related to the position and/or speed of the motor. This feedback can be used to control the motors.

SUMMARY

According to a number of implementations, the present disclosure relates to a cable-actuated position sensor. The sensor includes a measurement pulley system having a block and tackle configuration with a fixed block and a movable block, the measurement pulley system including a measurement cable that passes through one or more pulleys of the fixed block and one or more pulleys of the movable block such that distal movement of the measurement cable causes the movable block to approach the fixed block. The sensor also includes a rail system configured to direct movement of the movable block in a proximal and distal direction, the movable block operably coupled to the rail system. The sensor also includes a spring system coupled to the movable block and configured to provide a distal force in response to proximal movement of the movable block. The sensor also includes a coupler pulley system having a coupler pulley and a coupler cable coupled to the coupler pulley and attached to the movable block, the coupler pulley system configured to convert linear movement of the movable block into rotational movement of the coupler pulley. The sensor also includes a rotational sensor operably coupled to the coupler pulley such that rotational movement of the coupler pulley causes the rotational sensor to generate an output signal correlated to a displacement of the movable block.

In some embodiments, the sensor further includes an assembly plate configured to support the measurement pulley system, the rail system, the spring system, the coupler pulley system, and the rotational sensor. In further embodiments, the sensor further includes a housing configured to support the assembly plate.

In some embodiments, the rail system includes a single rail that passes through a corresponding conduit of the movable block. In some embodiments, the rail system includes two or more rails that pass through corresponding conduits of the movable block. In some embodiments, the spring system includes a constant force spring coupled to the movable block at a spring anchor.

In some embodiments, the rail system includes a linear guide formed by an assembly plate that supports one or more of the measurement pulley system, the rail system, the spring system, the coupler pulley system, and the rotational sensor. In further embodiments, the movable block includes feet that form a cavity that conforms to a cross-section of the linear guide.

In some embodiments, the spring system includes an extension spring operably coupled to the movable block through a spring cable attached to the movable block and to the extension spring. In further embodiments, the sensor further includes a second extension spring operably coupled to the movable block through a second spring cable attached to the movable block and to the second extension spring. In further embodiments, the spring system further includes a spring pulley system that redirects a proximal force exerted by the extension spring to a distal force applied on the movable block.

In some embodiments, the spring system includes a compression spring operably coupled to the movable block through a compression dowel attached to the movable block and operably coupled to the compression spring. In further embodiments, the sensor further includes an assembly plate forming a spring lumen to house the compression spring.

In some embodiments, the rotational sensor further includes a rotating component coupled to the coupler pulley such that rotation of the coupler pulley causes the rotating component to rotate. In further embodiments, rotation of the rotating component causes a change in the output signal of the rotational sensor.

In some embodiments, the coupler cable forms a closed loop that locks the displacement of the movable block to a rotational position of the coupler pulley. In some embodiments, the spring system includes a constant force spring coupled to the movable block at a spring anchor. In some embodiments, the output signal of the rotational sensor is proportional to the displacement of the movable block. In some embodiments, the spring system is attached to the fixed block. In some embodiments, the coupler pulley system further includes a coupler cable pulley configured to route the coupler cable from a distal side of the movable block to a proximal side of the movable block to form a closed loop. In some embodiments, the sensor is configured to measure displacements up to 20 inches.

According to a number of implementations, the present disclosure relates to a gear motor that includes a gear motor with a motor shaft, an output shaft, and one or more gears coupled to the motor shaft and to the output shaft to cause multiple rotations of the motor shaft to result in a single rotation of the output shaft. The gear motor also includes a cable actuated position sensor coupled to the output shaft, wherein rotation of the output shaft causes a cable of the cable actuated position sensor to be withdrawn from or retracted into the sensor. The gear motor also includes circuitry configured to receive a signal from the cable actuated position sensor.

In some embodiments, the sensor is configured to provide a signal corresponding to a linear displacement of the cable. In some embodiments, the sensor is configured to provide a signal corresponding to a rotational angle of the output shaft. In some embodiments, the circuitry is further configured to generate an absolute position of the output shaft based on the signal received from the sensor. In some embodiments, the circuitry is further configured to provide control of the absolute position or rotational angle of the output shaft based on the signal received from the sensor. In some embodiments, the cable actuated position sensor is any of the cable actuated position sensors disclosed herein.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

BRIEF DESCRIPTION OF THE DRAWINGS

FIGS. 1A, 1B, 1C, 1D, 1E, and 1F illustrate various views of an example cable-actuated position sensor that includes a plurality of block and tackle pulley systems with a single spring.

FIGS. 2A, 2B, 2C, 2D, 2E, and 2F illustrate various views of the sensor of FIGS. 1A-1F with additional components removed to allow other components to be more easily seen.

FIGS. 4A, 4B, 4C, 4D, and 4E illustrate additional views of the cable-actuated position sensor of FIG. 3.

DETAILED DESCRIPTION OF SOME EMBODIMENTS

Figure 1A:
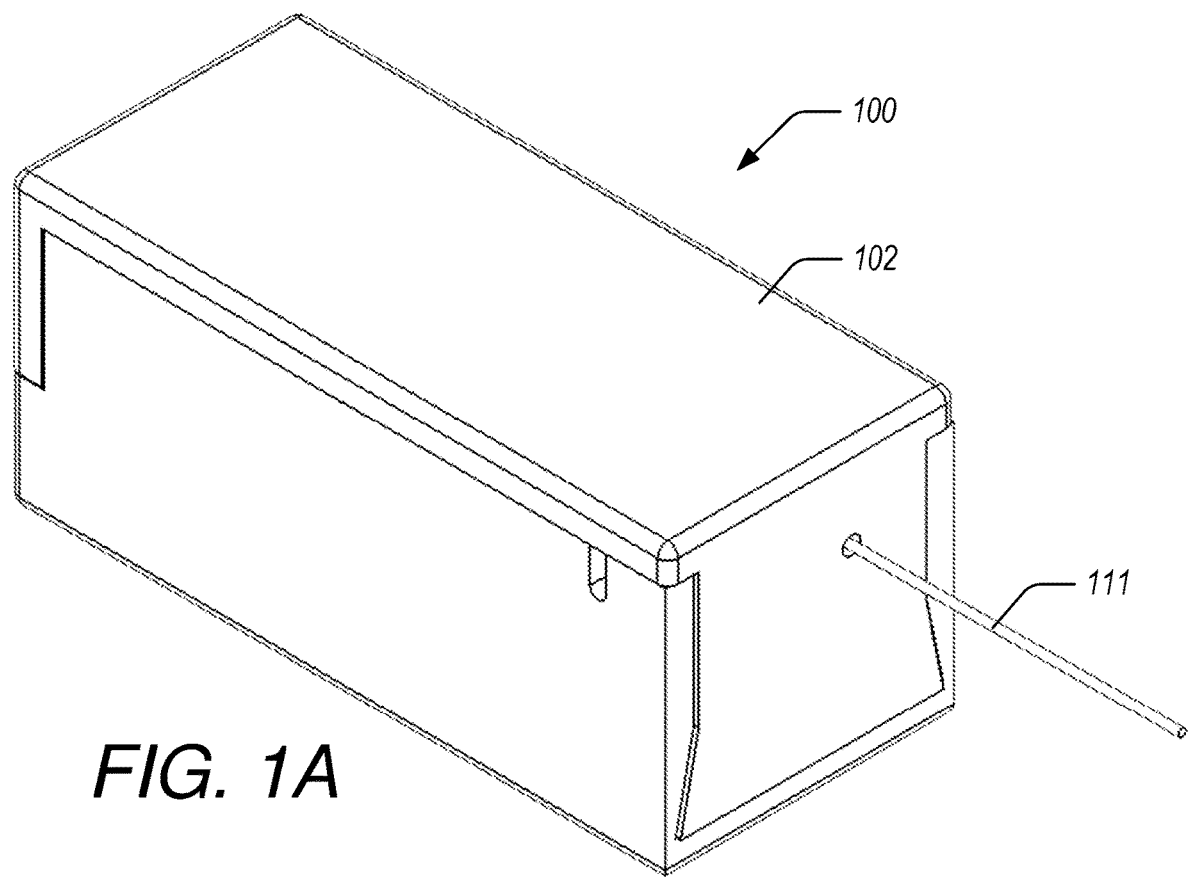

The headings provided herein, if any, are for convenience only and do not necessarily affect the scope or meaning of the claimed invention.
Overview Devices that measure displacement via a flexible displacement cable find application in a variety of fields. These devices can be used, for example, in applications such as robotics, hydraulic cylinder position measurement, automotive and aerospace testing, factory automation, medical devices, oil and chemical, structural testing, industrial machinery, industrial factory automation, die-casting or injection molding, etc. Such devices typically include a flexible cable or other type of string or filament that can be extracted from and retracted into a spring-loaded drum or other similar mechanism. Extracting or retracting the cable causes the drum to rotate a rotary sensor thereby providing a measurement of displacement of the cable. These devices can be referred to as, for example, cable position transducers, cable-actuated position sensors, cable extension transducers, cable sensors, cable-actuated sensors, string pots, string potentiometers, string encoders, draw wire sensors, draw wire encoders, draw wire transducers, wire rope transducers, wire sensors, wire-actuated transducers, yo-yo pots, or yo-yo potentiometers.

Cable-actuated position sensors can be used, either individually or in combination with one another, to track linear, rotary, 2-dimensional, and 3-dimensional displacements. The sensors allow for flexible placement and mounting options and can be routed around barriers using pulleys and/or flexible conduits or guides outside of the sensor. These sensors can be used to detect and measure linear and angular position, velocity, and/or acceleration using a flexible cable and a spring-loaded spool. In some applications, the body of the sensor or transducer is mounted to a fixed surface and the flexible cable is attached to a movable object. As the object moves, the transducer produces an electrical signal that is related (e.g., proportional) to the linear extension or velocity of the cable. This signal can then be sent to a display, a PLC, a data acquisition system, or the like.

However, typical string pots are expensive and/or relatively large. Typical string pots may also be non-linear due at least in part to the relationship between the cable and the rotation of the reel coupled to the cable for extraction and retraction purposes. Furthermore, typical sensors of this type may be limited in the displacements they are capable of measuring due at least in part to the size of the housing, consequently requiring a larger housing to provide larger measurement ranges.

Accordingly, to address these and other issues as well as to provide additional options in the market, described herein are cable-actuated position sensors that employ multiple block and tackle arrangements to measure displacement of a draw wire or flexible cable. The disclosed sensors are relatively small and inexpensive. The disclosed sensors may also be used as part of a servo motor, or in conjunction with gear motors to provide positional information for operation of the gear motor.

The disclosed sensors, transducers, and/or encoders provide a number of advantages over typical cable-actuated position sensors. Advantageously, some embodiments of the disclosed sensors can be relatively small. Advantageously, some embodiments of the disclosed sensors can be relatively inexpensive.

For example, the disclosed sensors can have a relatively small width, the width being slightly larger than the rotational sensor (e.g., potentiometer) used. As another example, the use of multiple block and tackle arrangements makes it possible to use a small, inexpensive single turn potentiometer. As another example, the linear movement of the block and tackle system is coupled to a potentiometer shaft with an inexpensive flexible filament instead of expensive gears or belts, as used in typical cable-actuated position sensors. As another example, the position and orientation of the spring in some embodiments of the disclosed sensors enables the use of an inexpensive extension spring instead of a more expensive constant force coil spring.

As another example, some embodiments of the disclosed sensors utilize a slender rectangular pulley system rather than a round take-up reel, as used in typical sensors. This results in the profile of the device being a rectangular shape. The rectangular shape makes the disclosed sensors better suited for smaller spaces than typical sensors.

As another example, some embodiments of the disclosed sensors loop a spring around a pulley system so that it takes up the space directly adjacent and parallel to the pulley system. Such a configuration makes the entire package smaller and more compact than typical sensors.

As another example, some embodiments of the disclosed sensors utilize a movable block in the pulley system that is linked to the potentiometer shaft by a flexible cable. Such embodiments do not require expensive gearing to link slide movement to potentiometer rotation.

As another example, some embodiments of the disclosed sensors use a spring-loaded pulley system rather than a round take-up reel. Due at least in part to the spring-loaded pulley system design, a targeted or improved mechanical advantage can be achieved. For example, a relatively strong spring can be used to overcome friction in the pulley system. This also enables a relatively small force to be required to extend the cable or draw wire.

As another example, some embodiments of the disclosed sensors utilize a pulley system that enables tuning of the ratio of the amount of cable let out of the sensor to the rotation of the potentiometer. Tuning this ratio may enable a relatively long extension of the string while still utilizing an inexpensive, single turn potentiometer rather than a more expensive multi-turn potentiometer.

As another example, some embodiments of the disclosed sensors allow for adjusting the amount of travel of the slide mechanism. This is possible due at least in part to the potentiometer being coupled to the movement of the slide mechanism rather than being directly coupled to the amount of string in the system. The amount of travel can be adjusted by changing the number of pulleys in the system. For example, the total extension length of the string (L) is approximately defined as the slide mechanism travel (T) times the number of pulleys (n) plus 1 or L=T (n+1). By adding or removing pulleys, the usable measurement length of the device can be adjusted.

The disclosed cable actuated position sensors can be used to provide position feedback for servo motors. Servo motors are electronic devices that move and that use position feedback to enable precise movement. Servo motors can be used in a variety of applications where it is beneficial to precisely control the movement, speed, and/or position of components. For example, servo motors can be used in robotics, CNC machinery, and/or automated manufacturing. Servo motors typically include a motor, gears, an output shaft, a positional sensor, and circuitry to control the motor based on feedback from the positional sensor. The gearing in a servo motor enables precise movement of the output shaft. The gearing can be configured so that tens or hundreds of rotations of the motor shaft (i.e., the shaft directly coupled to the output of the motor) corresponds to a single rotation of the output shaft.

Although servo motors can be a useful tool, there are certain disadvantages inherent in current designs. For example, servo motors can be expensive and difficult to implement. They may require expensive motors, complicated control systems, and/or complicated or expensive sensors. This cost and complexity keep this technology out of reach for individuals or small companies with limited resources. Moreover, the cost may be prohibitive for certain implementations that may require a relatively large number of servo motors.

Accordingly, to address these and other related issues and to provide choice in the market, described herein are examples of servo motors or gear motor conversion kits. The disclosed motors and conversion kits use inexpensive gear motors in conjunction with inexpensive cable actuated position sensors disclosed herein to create an easy-to-implement and cost-effective servo system.

A cable actuated position sensor, such as the sensors disclosed herein, is coupled to the output shaft of a standard gear motor by connecting the cable to the output shaft or to a pulley on the output shaft. As the output shaft rotates, the cable of the sensor winds around the pulley or the output shaft, transferring the output shaft rotary motion to linear motion for the sensor. The output signal of the cable actuated position sensor is then used to track and to control the output shaft position, speed, or angle without needing to track the position or rotation of the motor shaft.

Connecting the cable actuated position sensor directly to the output shaft of the gear motor provides a number of advantages, as disclosed in greater detail herein. For example, the disclosed motors that measure rotation of the output shaft are less complex than servo motors that track the position of the motor shaft. Another advantage is that the disclosed motors that couple a cable actuated position sensor to the output shaft provide absolute position sensing which is advantageous over servo motors that can only provide relative position sensing.

Example Embodiments of Cable-Actuated Position Sensors

FIGS. 1A, 1B, 1C, 1D, 1E, and 1F illustrate various views of an example cable-actuated position sensor 100 that includes a plurality of block and tackle pulley systems with a single spring. The width of the sensor 100 can be approximately the same width, or slightly larger, as a rotational sensor 140 used to measure displacement of a flexible cable 111. This is possible due at least in part to using a measurement pulley system 110, a spring pulley system 120, and a coupler pulley system 130. Although the term sensor is used throughout this disclosure, it is to be understood that the disclosed embodiments may be used and/or referred to as encoders and/or transducers.

FIG. 1A illustrates the sensor 100 with a housing 102 from which the flexible cable 111 extends. The flexible cable 111 can be pulled and extracted from the housing 102. In response, the sensor 100 provides a signal indicative of the displacement of the cable 111. The flexible cable 111 may be also referred to as a flexible filament, a draw wire, a string, or any other flexible cable-like material or component.

The housing 102 can be of a unitary design or it can be made of two or more pieces that are secured together using adhesives, fasteners, friction, or the like. The housing 102 is configured to house components to provide protection and structural support to these components. The housing 102 can be made of any suitable material such as plastic. The housing 102 can include one or more access ports for electrical connections to be made to the rotational sensor 140 (or potentiometer or pot) housed within the housing 102. The housing 102 may also include features facilitating mounting the sensor 100 to a targeted object or surface. Likewise, the cable 111 can include a feature at a distal end of the cable 111 that facilitates its attachment to a targeted object or surface.

Figure 1B:
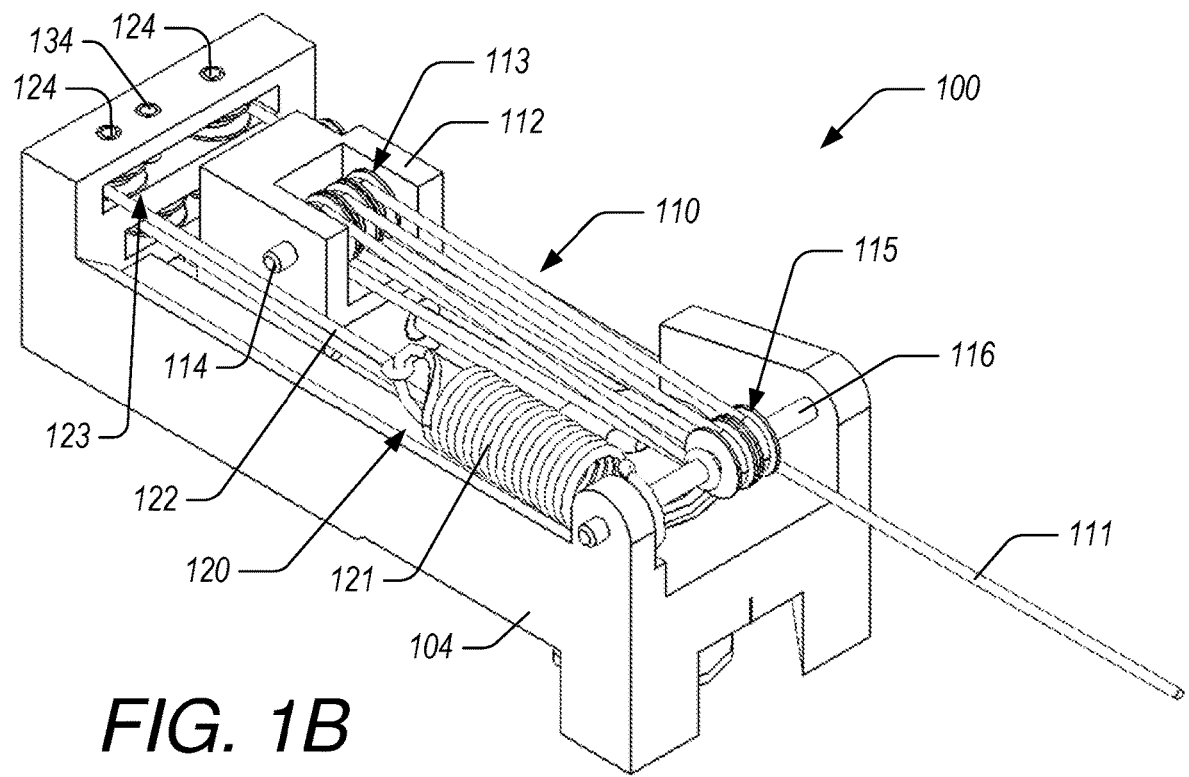
Figure 1C:
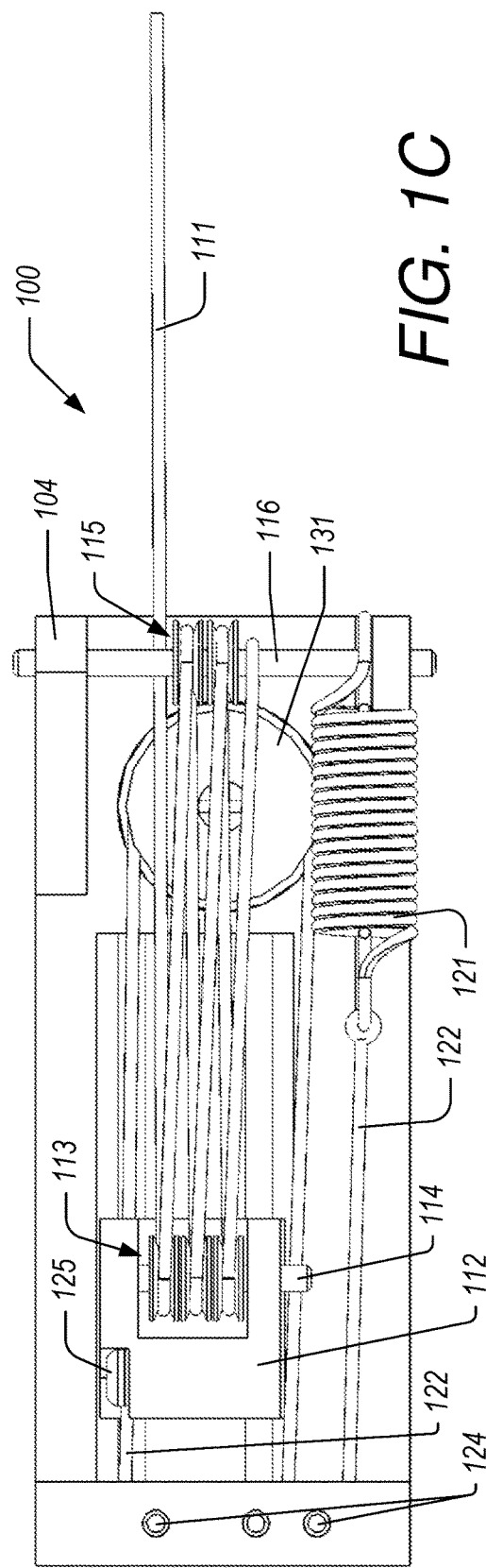
Figure 1D:
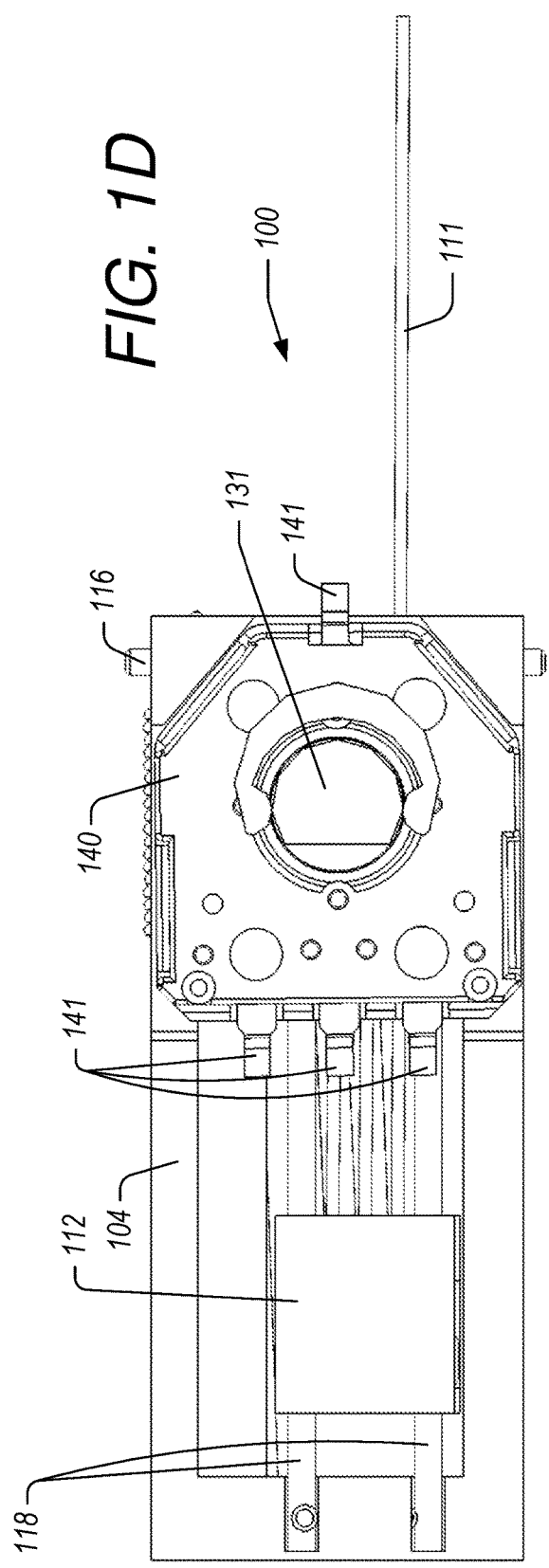

FIGS. 1B-1F illustrates the sensor 100 with the housing 102 removed to reveal components of the sensor 100. In particular, FIG. 1B illustrates a perspective view of the sensor 100 without the housing 102. FIG. 1C illustrates a top view of the sensor 100. FIG. 1D illustrates a bottom view of the sensor 100. FIGS. 1E and 1F illustrate side views of the sensor 100.

The sensor 100 includes an assembly plate 104 that provides structural support to the components within the housing 102. In some embodiments, the assembly plate 104 is integral with the housing 102 such that the components are structurally supported by the housing 102 rather than an additional component within the housing 102, such as the assembly plate 104.

The sensor 100 includes the measurement pulley system 110 that includes a block and tackle configuration. The measurement pulley system 110 includes a movable block 112 with a movable block dowel 114 supporting a plurality of movable block pulleys 113. The measurement pulley system 110 also includes a plurality of proximal pulleys 115 supported by a proximal dowel 116. The flexible cable 111 is threaded through the proximal pulleys 115 and the movable block pulleys 113. As illustrated, the flexible cable 111 is attached to the proximal dowel 116, however the cable 111 may alternatively be attached to the movable block dowel 114, the movable block 112, or elsewhere on the assembly plate 104.

Pulling or extracting the cable 111 (e.g., applying a proximal force on the cable 111) causes the movable block 112 to move proximally along guide rails 118. The movable block can include slide bearings 119 (shown in FIG. 2B) to facilitate proximal and distal movement along the guide rails 118. The guide rails are supported by the assembly plate 104.

As the cable 111 is pulled proximally, the movable block pulleys 113 rotate with or around the movable block dowel 114 that is secured to the movable block 112 and the proximal pulleys 115 rotate with or around the proximal dowel 116 with the proximal dowel 116 being secured in place to the assembly plate 104. As described in greater detail herein, linear movement of the movable block 112 is converted by a coupler pulley 131 into rotational movement of a component of a rotational sensor 140 (e.g., an encoder or potentiometer) that outputs a signal (e.g., using electrical connectors 141) related to the displacement of the flexible cable 111.

The sensor 100 includes a spring pulley system that is configured to maintain tension on the cable 111 and/or to provide a restorative or retracting force to the flexible cable 111 via the movable block 112. The spring pulley system 120 includes a spring 121, a spring cable 122, and spring pulleys 123 that route the spring cable 122 from the spring 121 to the movable block 112 so that the spring 121 applies a distal force (e.g., a restoring or retraction force) on the movable block 112 when it is displaced proximally. As described above, extracting the cable 111 causes the movable block 112 to move proximally. Proximal movement of the movable block 112 causes the spring cable 122 to apply a distal force on the spring 121. Consequently, the spring 121 exerts a proximal force on the string 122 which is redirected by the spring pulleys 123 so that it is a distal force on the movable block 112. The spring 121 is secured or attached to the proximal dowel 116. Alternatively, the spring 121 can be attached to the assembly plate 104, to the fixed block, or to any other fixed component of the sensor 100.

The spring pulleys 123 are supported by spring dowels 124 and are secured to the assembly plate 104 with these dowels.

The sensor 100 includes a rotational sensor 140 that is configured to output a signal indicative of a rotation of a component (e.g., a rotor or shaft) within the rotational sensor 140. In the sensor 100, the rotating component of the rotational sensor 140 creates an electrical signal correlated to the linear extension and/or velocity of the cable 111. As described herein, movement of the movable block 112 causes the coupler pulley 131 to rotate. The sensor 100 also includes a bearing 139, such as a sleeve bearing and/or a ball bearing, to reduce friction for the coupler pulley 131. The coupler pulley 131 is coupled to the rotating component of the rotational sensor 140 such that rotation of the coupler pulley 131 causes the rotating component of the rotational sensor 140 to rotate. This in turn causes a change in the signal output by the rotational sensor 140. In this way, linear movement of the movable block 112 is correlated with the signal output by the rotational sensor 140.

In some embodiments, the sensor 100 includes additional electronics to modify the signal output by the rotational sensor 140 to achieve a targeted relationship (e.g., linear) between the position of the movable block 112 and the output signal. The rotational sensor 140 includes one or more electrical connectors 141 to receive a supply voltage, to connect to a reference potential, and/or to provide output signals indicative of the rotational position of the measurement component of the sensor 140. In some embodiments, the rotational sensor 140 may be connected as a three-wire tapped resistor (voltage divider), in a control circuit, or may be packaged with electronics to produce a measurement signal in a useful form, such as a variable voltage, variable current, pulse encoder, USB or RS232 communications.

An advantage of the sensor 100 is that the number of pulleys in the proximal pulleys 115 and or the movable block pulleys 113 can be modified to change the properties of the sensor 100. For example, the number of pulleys can be modified to change the relationship between extension of the cable 111 and movement of the movable block 112. This may be beneficial where an application may benefit in a trade-off between precision and measurement range. It should be noted, that although two and three pulleys are shown respectively in the proximal pulleys 115 and the movable block pulleys 113 that different numbers of pulleys may be used to provide targeted performance characteristics.

Another advantage of the sensor 100 is that it does not use any gears in its operation. The moving parts of the sensor 100 include pulleys, movable blocks, and cables. This may increase reliability of operation, decrease the cost of manufacturing, and/or reduce the size of the sensor 100.

The sensor 100 can come in a variety of sizes to serve a variety of purposes. For example, a first size of the sensor 100 can be approximately 1 inch×0.6 inch×0.6 inch, a second size of the sensor 100 can be approximately 1.75 inch×1 inch×0.6 inch, and a third size of the sensor 100 can be approximately 4 inch×1 inch×1 inch. Each sensor size can be used in applications where different ranges of displacements would be utilized. For example, the first size of the sensor 100 can be used to measure displacements that range from about 1.5 inches to about 3 inches, the second size of the sensor 100 can be used to measure displacements that range from about 3 inches to about 6 inches, and the third size of the sensor 100 can be used to measure displacements that range from about 6 inches to about 12 inches. However, it is to be understood that the sensor 100 can be made in a variety of sizes and can measure a variety of displacement ranges. For example, the sensor 100 may be increased in size relative to the third size to measure displacements up to about 20 inches.

Figure 2A:
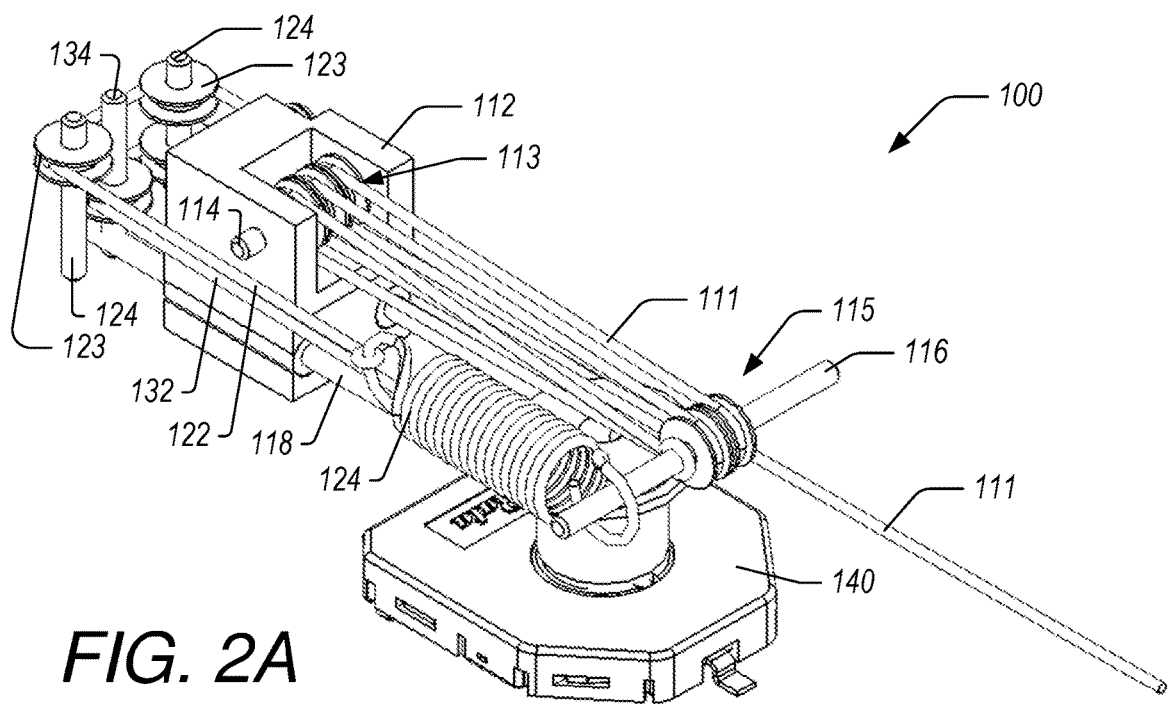
Figure 2B:
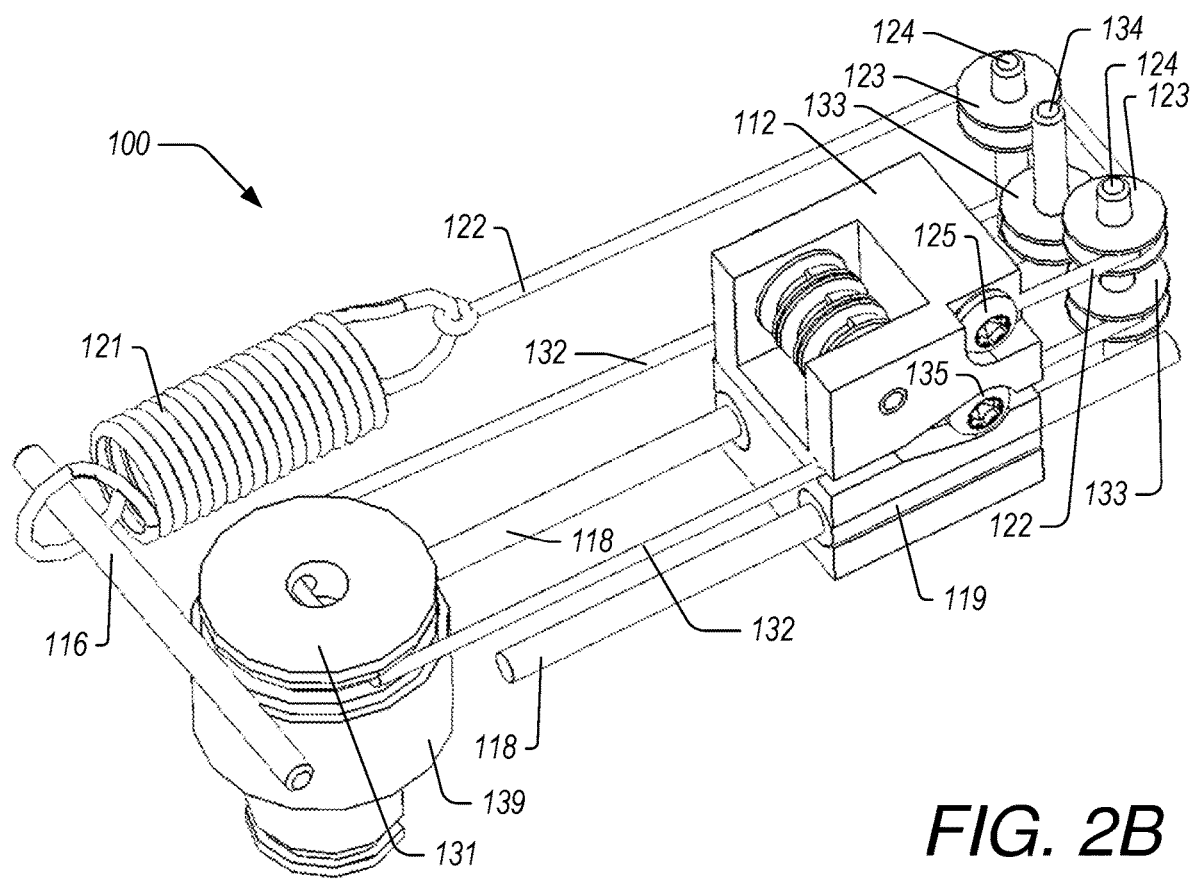
Figure 2E:
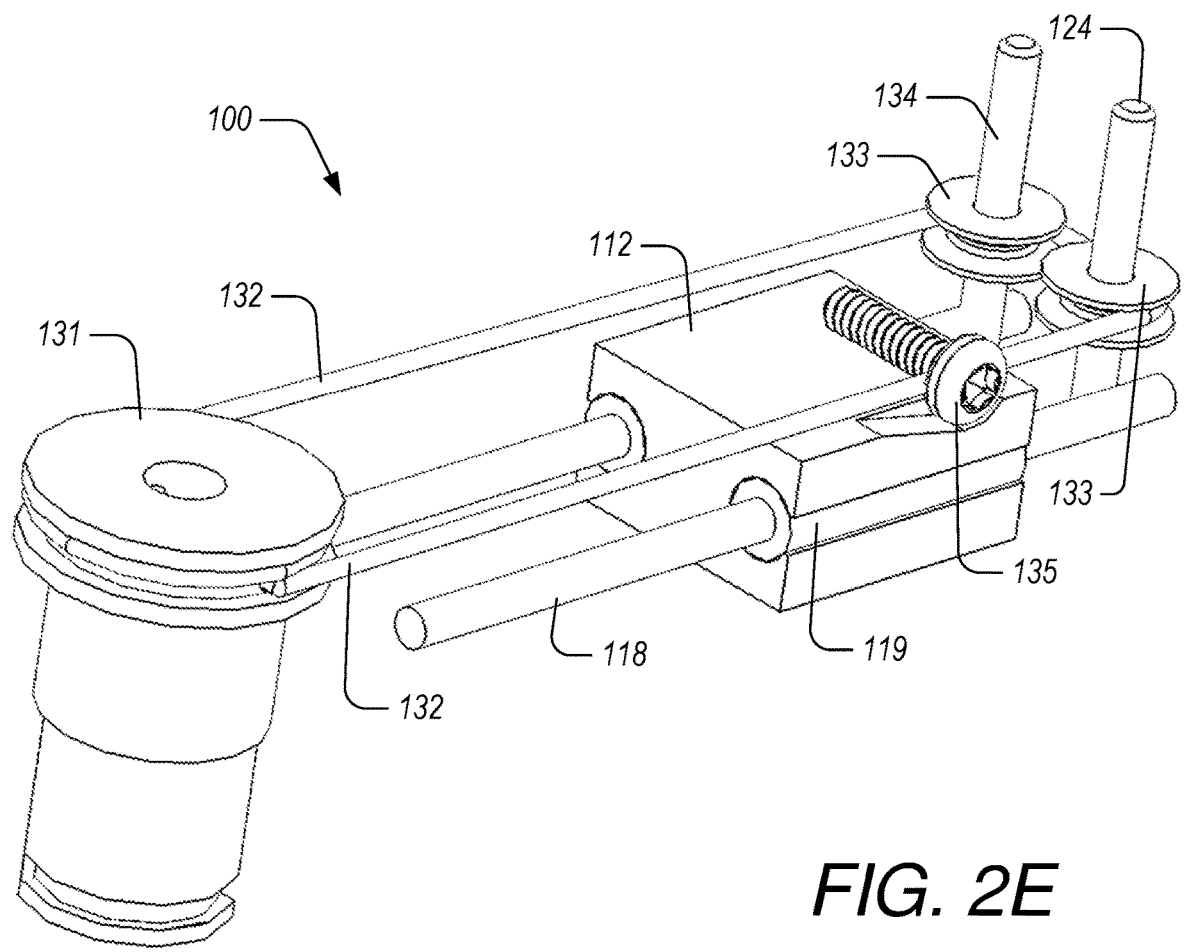
Figure 2F:
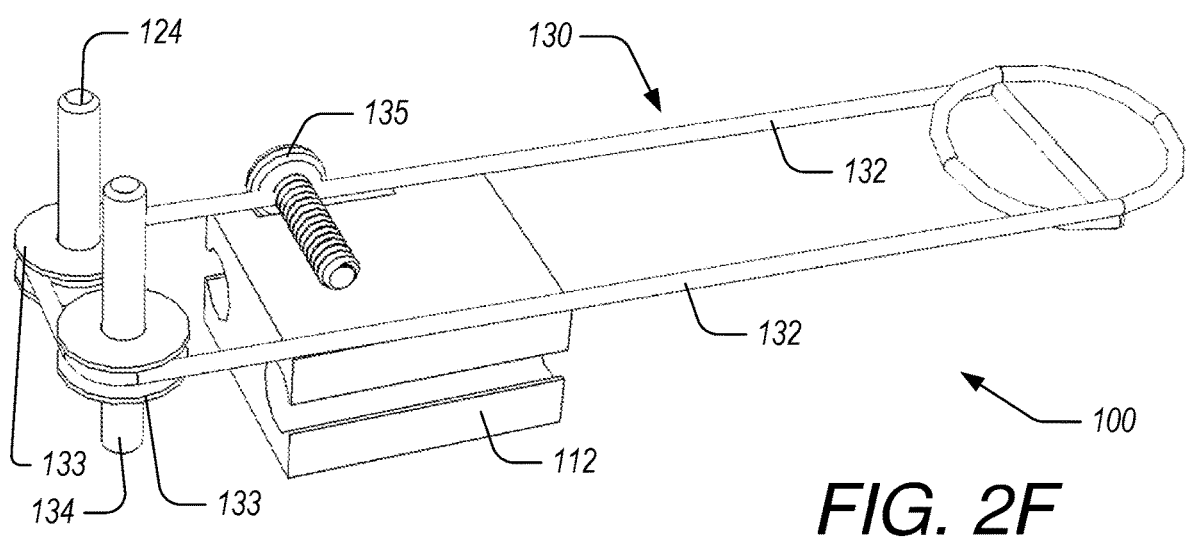

FIGS. 2A, 2B, 2C, 2D, 2E, and 2F illustrate the sensor 100 with additional components removed to allow other components to be more easily seen. FIGS. 2A, 2C, and 2D illustrates a perspective view of the sensor 100 with the assembly plate 104 removed. FIG. 2B illustrates a perspective view of the sensor 100 with the flexible cable 111 removed as well as the proximal pulleys 115. FIG. 2E illustrates the sensor 100 with many components removed to better illustrate the coupler pulley system. FIG. 2F illustrates the sensor 100 with additional components removed, including the coupler pulley 131, to illustrate the routing and configuration of the coupler cable 132.

With reference to FIGS. 2A-2F, the sensor 100 includes a coupler pulley system 130 that includes a coupler pulley 131, a coupler cable 132, coupler cable pulleys 133, a coupler dowel 134, and a coupler cable anchor 135. The coupler pulley 131 is operationally coupled to the rotational sensor 140 such that rotation of the coupler pulley 131 causes a rotating component of the rotational sensor 140 to rotate. The coupler cable 132 is wrapped around and through an upper portion of the coupler pulley 131. The coupler cable 132 is also anchored to the movable block 112 using the coupler cable anchor 135. In some embodiments, the coupler cable 132 is affixed, secured, or anchored to the coupler pulley 131 using a fastener or adhesive. In some embodiments, the coupler cable 132 is coupled to the coupler pulley 131 so that friction between the coupler cable 132 and the coupler pulley 131 causes the coupler pulley 131 to rotate in response to movement of the coupler cable 132.

Translation of the movable block 112 causes the coupler cable anchor 135 to move which in turn causes the coupler cable 132 to move along a circuitous path from the cable anchor 135 around and through the upper portion of the coupler pulley 131 around a pair of coupler cable pulleys 133 and back to the coupler cable anchor 135. With particular reference to FIG. 2F, it can be seen that the circuitous path of the coupler cable 132 causes the coupler pulley 131 to rotate when the movable block 112 moves back and forth along the guide rails 118. It should be noted that an upper portion of the movable block 112 has been removed for clarity of illustration in FIGS. 2E and 2F.

The coupler cable pulleys 133 are secured to a coupler dowel 134 and to a spring dowel 124. In some embodiments, an additional coupler dowel 134 can be used so that the coupler cable pulleys 133 are each separately supported by an individual coupler dowel 134 rather than sharing a spring dowel 124 with a spring pulley 124. The coupler dowel 134 is secured to the assembly plate 104.

Figure 3:
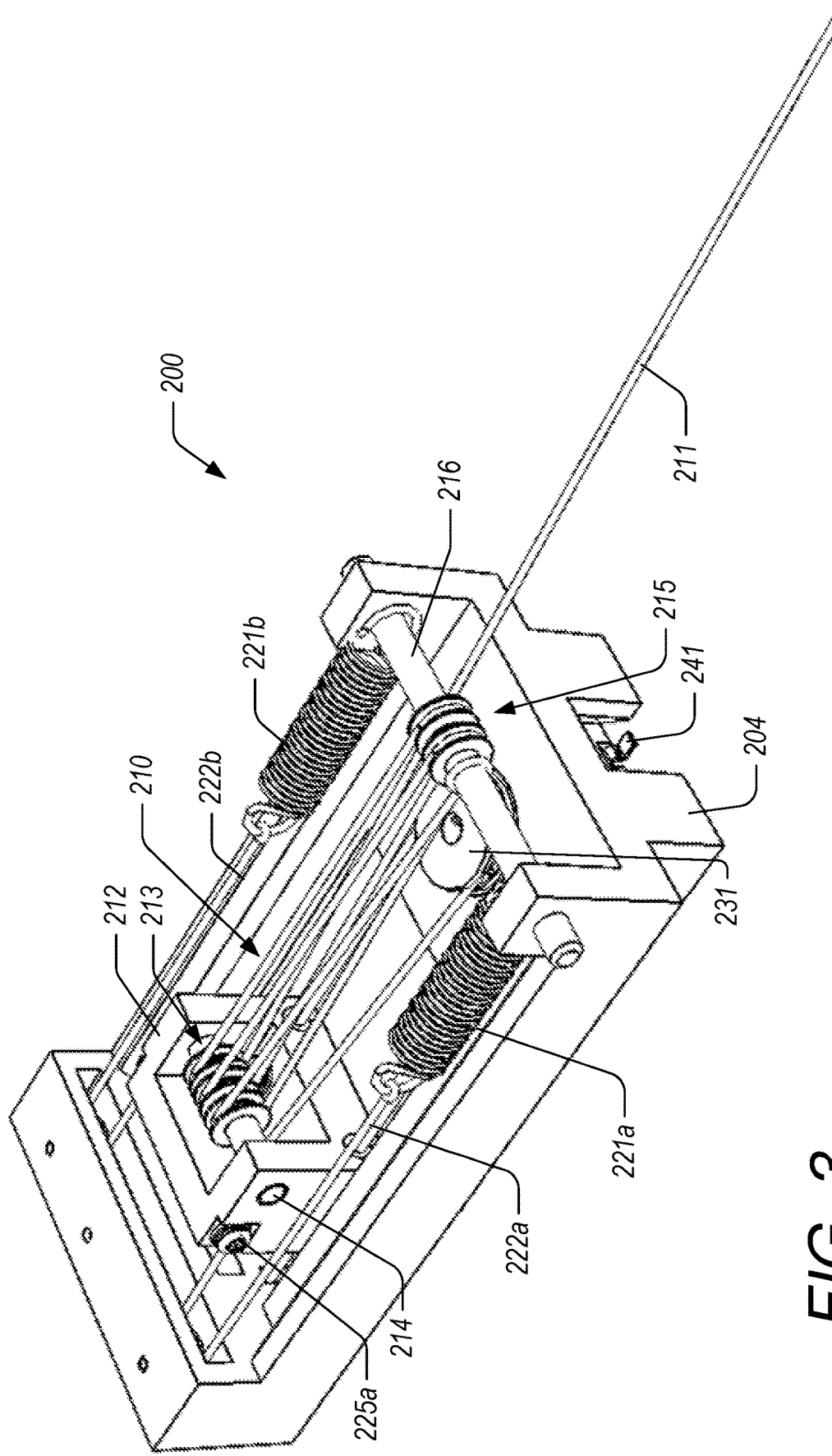
FIG. 3 illustrates another example embodiment of a cable-actuated position sensor.

FIGS. 3, 4A, 4B, 4C, 4D, and 4E illustrate another example embodiment of a cable-actuated position sensor 200. FIG. 3 illustrates the sensor 200 without a housing, as illustrated for the sensor 100 in FIG. 1A, however it is to be understood that the sensor 200 can include a housing similar to the housing 102 described herein with reference to FIG. 1A. The sensor 200 is similar to the sensor 100 described herein with reference to FIGS. 1A-2F except that the sensor 200 includes a dual spring pulley system 220. This presents certain advantages, such as an increase in force to overcome friction. This allows additional pulleys to be utilized on the movable block resulting in longer extension or displacement measurement capabilities without increasing the size (e.g., the length) of the sensor 200. It is to be understood, however, that adding pulleys may increase the width of the sensor 200.

Figure 4D:
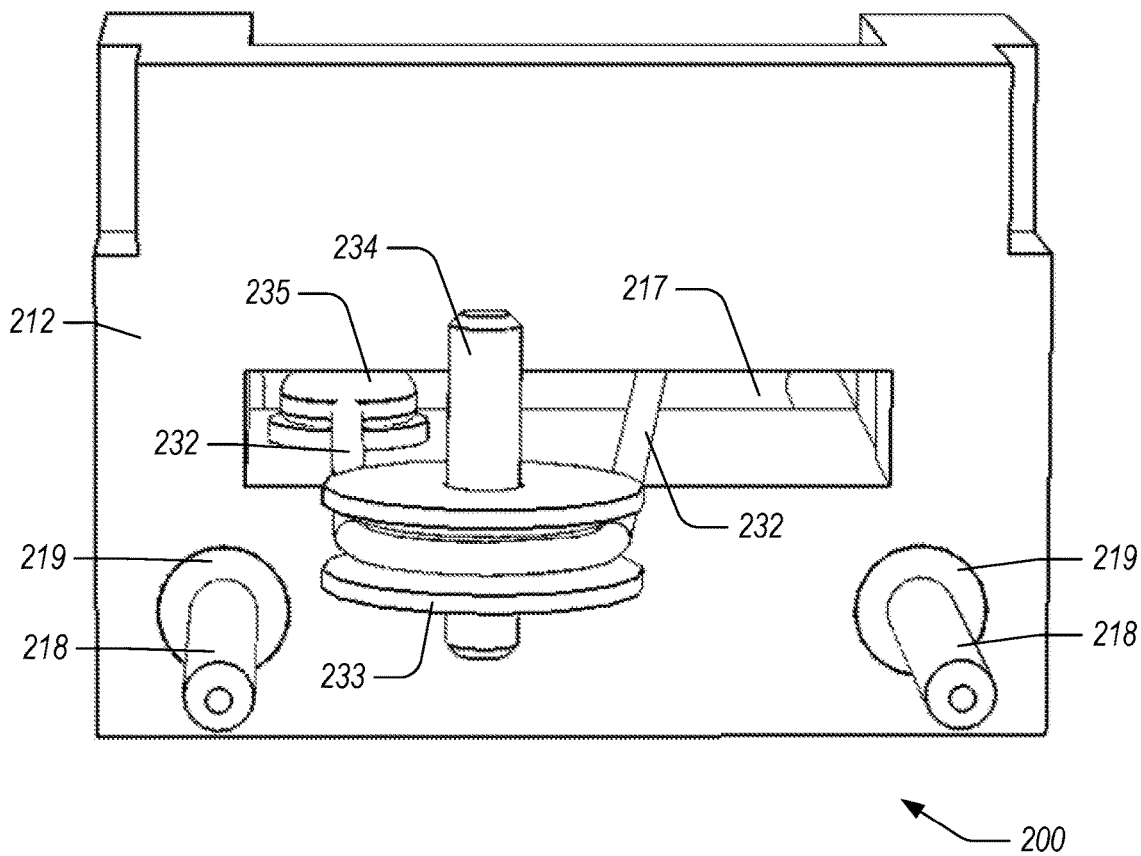
Figure 4E:
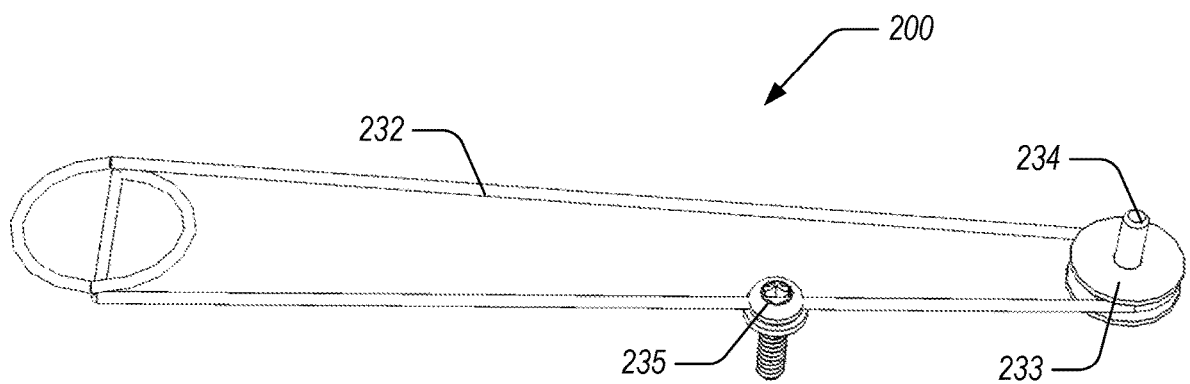

The sensor 200 includes an assembly plate 204 that supports the components that make up the sensor 200. In some embodiments, the assembly plate 204 can be integrated with the housing so that the components are supported by the housing. FIG. 4A illustrates the sensor 200 with the assembly plate 204 removed to better illustrate certain components of the sensor 200. FIG. 4B illustrates the sensor 200 without the measurement pulley system 210 to better illustrate the dual spring pulley system 220. FIGS. 4C-4E illustrate the sensor 200 without the dual spring pulley system 220 to better illustrate the coupler pulley system 230.

The sensor 200 includes a measurement pulley system 210 that includes a measurement cable 211, a movable block 212 that includes a plurality of movable block pulleys 213 supported by a movable block dowel 214, and proximal pulleys 215 supported by proximal dowel 216. The measurement cable 211 is similar to the measurement cable 111 described herein with reference to FIG. 1A in that it is a flexible cable or filament that extends from the sensor 200 and is threaded through the measurement pulley system 210. As the measurement cable 211 extends from the sensor 200, the movable block 212 moves proximally which in turn causes a coupler pulley 231 to rotate which in turn causes a rotational sensor 240 to output a signal correlated to the displacement of the measurement cable 211.

The movable block 212 is configured to translate proximally and distally along guide rails 218. The movable block 212 includes bearings 219 that facilitate movement along the guide rails 218. The movable block 212 includes lumens or conduits that support the bearings 219 and through which the guide rails 218 pass. The guide rails 218 are supported by the assembly plate 204.

The sensor 200 also includes a dual spring pulley system 220 that is configured to maintain tension on the cable 211 and to provide a restorative or retraction force on the movable block 212 and hence the cable 211. The dual spring pulley system 220 includes a spring pulley system on either side of the movable block 212. The dual spring pulley system 220 includes a first spring 221a coupled to the proximal dowel 216 and to a first spring cable 222a that passes around a first spring pulley 223a and is anchored to the movable block 212 at a first spring anchor 225a. The dual spring pulley system 220 also includes a second spring 221b coupled to the proximal dowel 216 and to a second spring cable 222b that passes around a second spring pulley 223b and is anchored to the movable block 212 at a second spring anchor 225b. The first and second spring pulleys 223a, 223b are configured to redirect the proximal forces exerted by first and second springs 221a, 221b so that they apply a distal force on the movable block 212 when the movable block is displaced proximally. The first spring pulley 223a is supported by a first spring dowel 224a that is supported by the assembly plate 204. Similarly, the second spring pulley 223b is supported by a second spring dowel 224b that is supported by the assembly plate 204.

The sensor 200 also includes a coupler pulley system 230 that is configured to convert movement of the movable block 212 into rotational movement of a coupler pulley 231. In turn, the coupler pulley 231 is configured to rotate a rotating component of a rotational sensor 240 thereby causing the rotational sensor 240 to output a signal. The output signal of the rotational sensor 240 is thus correlated with displacement of the movable block 212. Similar to the rotational sensor 140, the rotational sensor 240 includes electronic connectors 241 to receive and/or to output electronic signals.

The coupler pulley system 230 includes the coupler pulley 231, a coupler cable 232, a coupler cable pulley 233 supported by a coupler dowel 234, and a coupler cable anchor 235 that secures the coupler cable 232 to the movable block 212. The coupler cable 232 forms a closed loop around the coupler cable pulley 233 and around the coupler pulley 231. The coupler cable anchor 235 provides a fixed point for the coupler cable 232 so that as the movable block 212 moves proximally and distally that fixed point moves along with the movable block 212. This in turn causes the coupler pulley 231 to rotate due to the coupler cable 232 being looped around and routed through an upper portion of the coupler pulley 231, the configuration of the coupler cable 232 being most easily seen in FIG. 4E. The coupler cable 232 is routed through an opening 217 formed by the movable block 212, the opening 217 formed beneath the movable block dowel 214. The coupler cable anchor 235 is positioned within the opening 217, as can be most easily seen in FIG. 4D.

Figure 5:
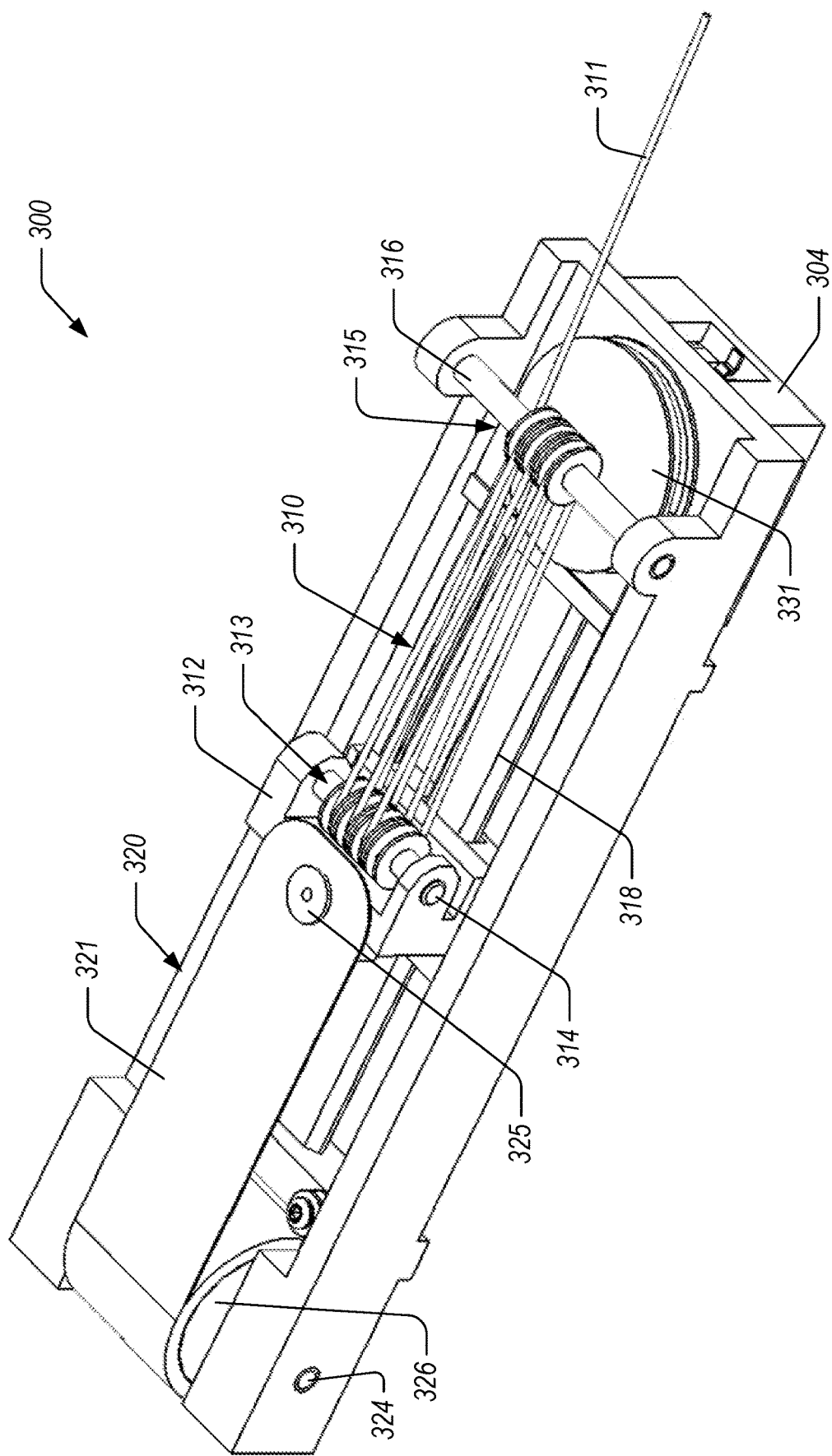
FIG. 5 illustrates another example embodiment of a cable-actuated position sensor.

FIGS. 5, 6A, 6B, 6C, and 6D illustrate another example embodiment of a cable-actuated position sensor 300. FIG. 5 illustrates the sensor 300 without a housing, as illustrated for the sensor 100 in FIG. 1A, however it is to be understood that the sensor 300 can include a housing similar to the housing 102 described herein with reference to FIG. 1A. The sensor 300 is similar to the sensor 100 and to the sensor 200 described herein with reference to FIGS. 1A-4E except that the sensor 300 includes a constant force spring system 320 rather than a spring pulley system. This presents certain advantages, such as a constant force spring can extend farther than extension springs for a given housing or sensor size. For example, for an extension spring to extend multiple inches the spring itself would need to be multiple inches in length at rest which would increase the size of the sensor. Another advantage is that a constant force spring that has a similar size as an extension spring can typically exert an appreciable or targeted force over larger distances.

Figure 6A:
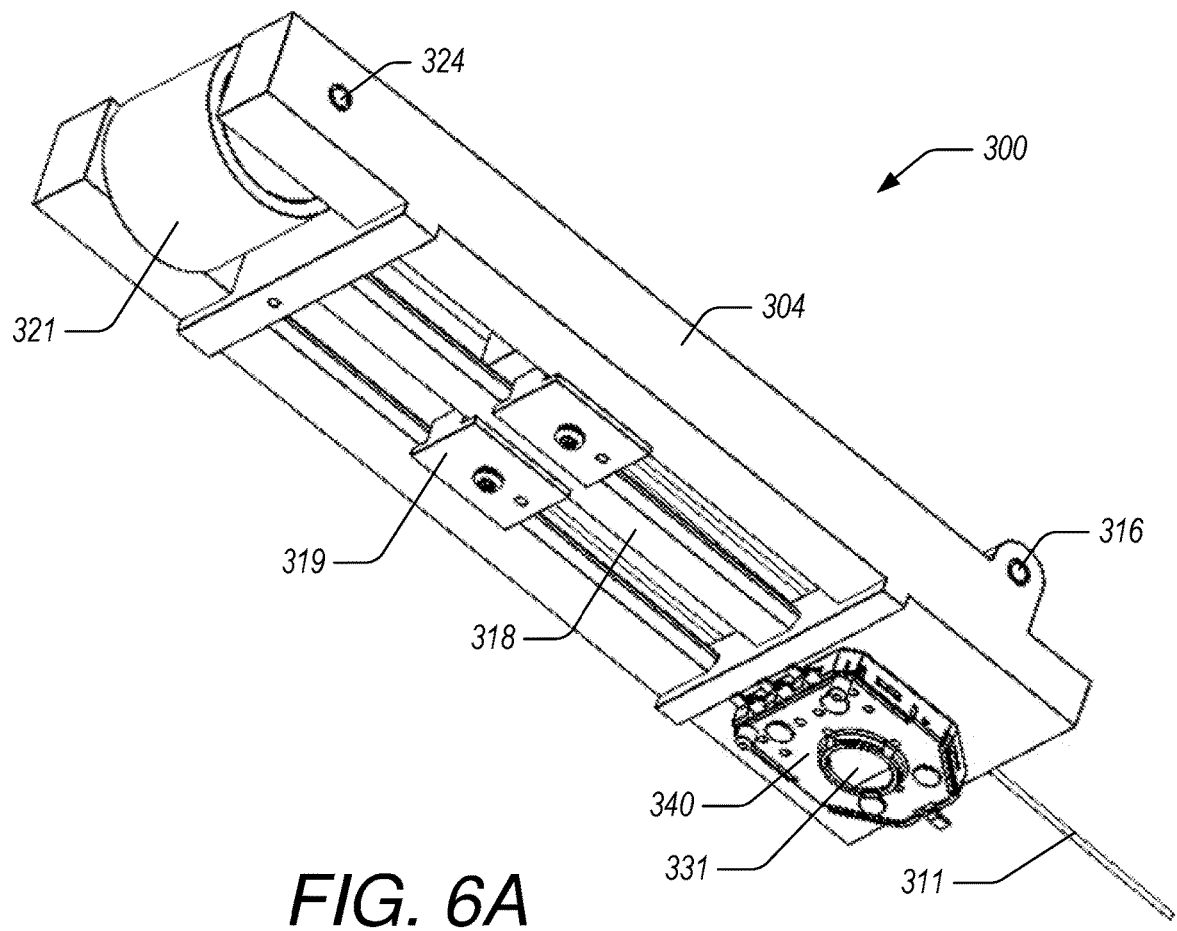
FIGS. 6A, 6B, 6C, and 6D illustrate additional views of the cable-actuated position sensor of FIG. 5.
Figure 6B:
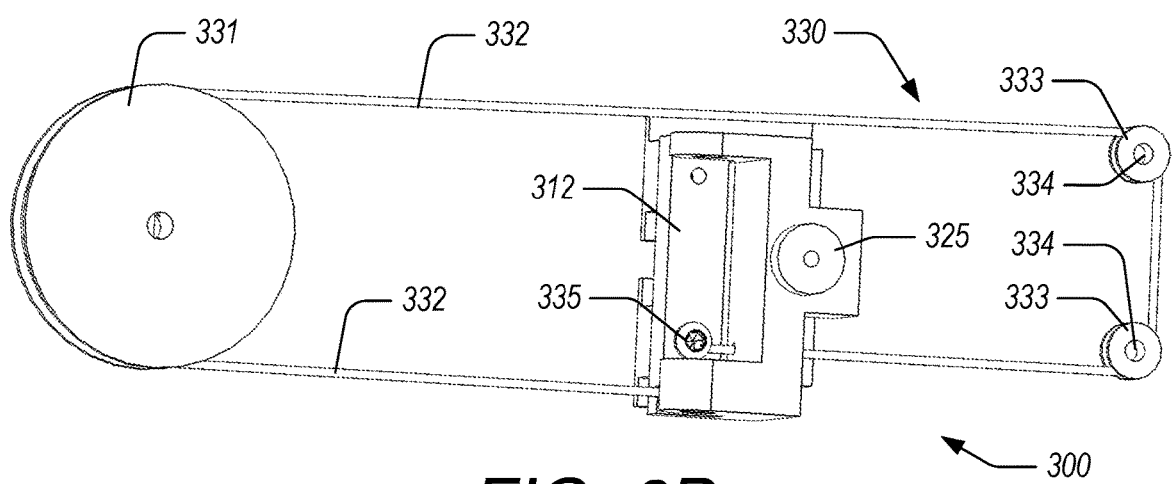
Figure 6C:
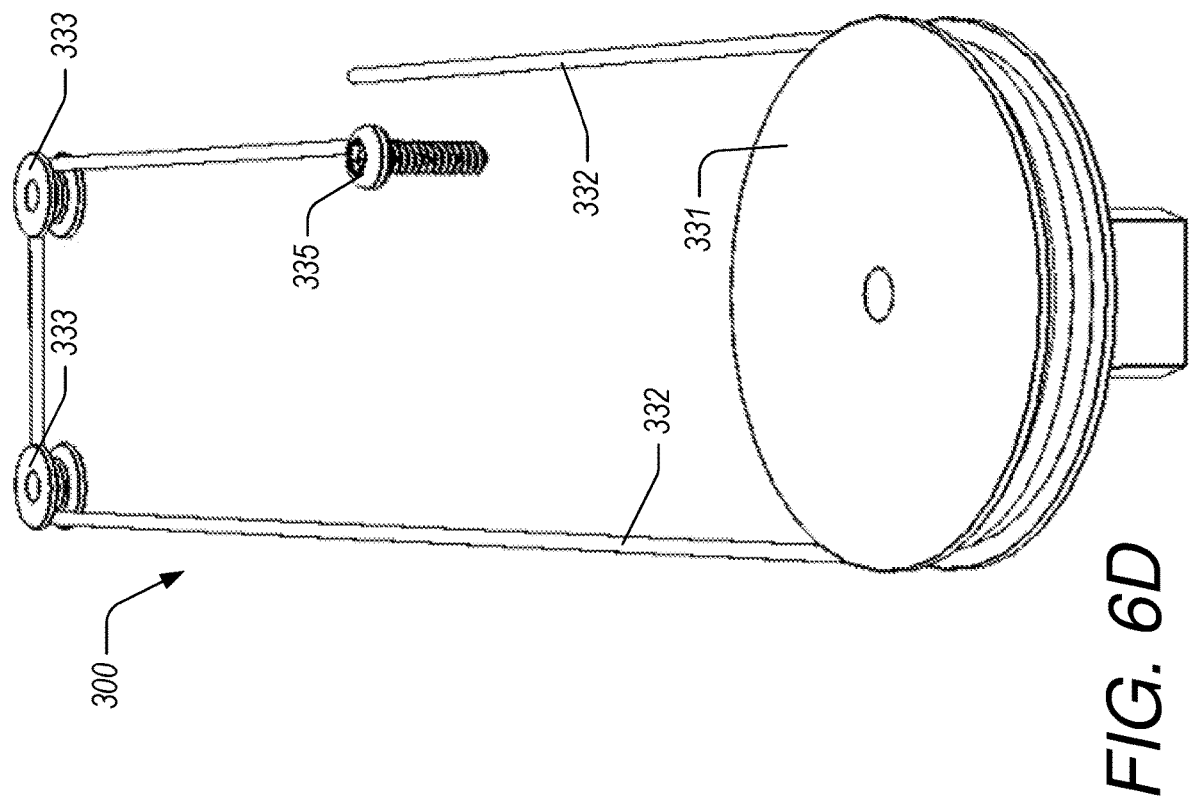
Figure 6D:
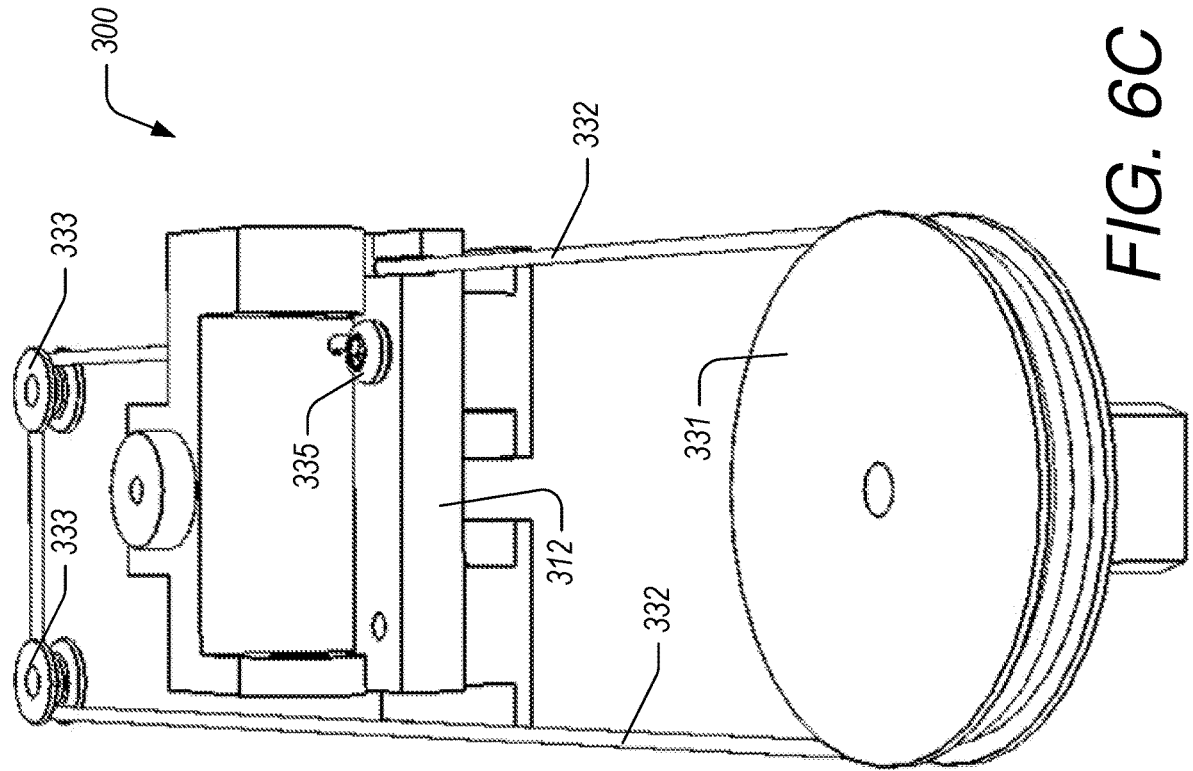

The sensor 300 includes an assembly plate 304 that supports the components that make up the sensor 300. In some embodiments, the assembly plate 304 can be integrated with the housing so that the components are supported by the housing. FIG. 6A illustrates a bottom portion of the sensor 300 to better illustrate a linear guide 318 formed by the assembly plate 304. FIGS. 6B-6D illustrate the sensor 300 without the assembly plate 304, the measurement pulley system 310, or the constant force spring system 320 to better illustrate the coupler pulley system 330.

The sensor 300 includes a measurement pulley system 310 having a measurement cable 311, a movable block 312, movable block pulleys 313 supported by a movable block dowel 314, and proximal pulleys 315 supported by a proximal dowel 316, similar to the measurement pulley systems 110 and 210 described herein. The movable block 312 is configured to translate along a linear guide 318 formed by the assembly plate 304. The movable block 312 includes feet 319 that form a cavity that conforms to the shape of the cross-section of the linear guide 318, so that when the feet 319 are attached to the movable block 312, the movable block 312 is secured to the linear guide 318 in such a way that allows proximal and distal movement of the movable block 312. The measurement pulley system 310 functions in a similar way to the pulley systems 110, 210 described elsewhere herein.

The sensor 300 includes a constant force spring system 320 that is configured to maintain tension on the measurement cable 311 and/or to provide a restorative or retraction force on the cable 311. The constant force spring system 320 includes a constant force spring 321 (e.g., a clock spring) attached to the movable block 312 at a spring anchor 325. The constant force spring 321 is wrapped around a drum 326 that is supported by a spring dowel 324 attached to the assembly plate 304. When the movable block 312 is displaced proximally, the constant force spring 321 exerts a distal force on the movable block.

The sensor 300 includes a coupler pulley system 330 that is configured to convert linear displacement of the movable block 312 into an angular displacement (e.g., a rotation), similar to the coupler pulley systems 130, 230 described elsewhere herein. The coupler pulley system 330 includes a coupler pulley 331, a coupler cable 332, a coupler cable pulleys 333 supported by coupler cable dowels 334, and a coupler cable anchor 335. The coupler cable 332 is wrapped one or more times around the coupler pulley 331 and through a lumen that passes through a center of the upper portion of the coupler pulley 331. The coupler cable 332 is also attached to the movable block 312 at the coupler cable anchor 335 and to another point on the movable block 312. The coupler cable 332 thus forms a closed loop that converts linear displacement of the movable block 312 into rotation of the coupler pulley 331. Likewise, the closed loop formed by the coupler cable 332 locks the linear position of the movable block 312 to the rotational position of the coupler pulley 331.

The sensor 300 includes a rotational sensor 340 that is coupled to the coupler pulley 331. Rotation of the coupler pulley 331 rotates a component of the rotational sensor 340 thereby causing a change in a signal output by the rotational sensor 340. In some embodiments, the linear displacement of the movable block 312 is proportional to the signal output by the rotational sensor 340. In other embodiments, the signal output is correlated to the position of the movable block 312 using another function (e.g., other than a linear relationship). Thus, by reading the signal output of the sensor 300, a displacement, a velocity, and/or an acceleration of the cable 311 can be determined.

Figure 7:
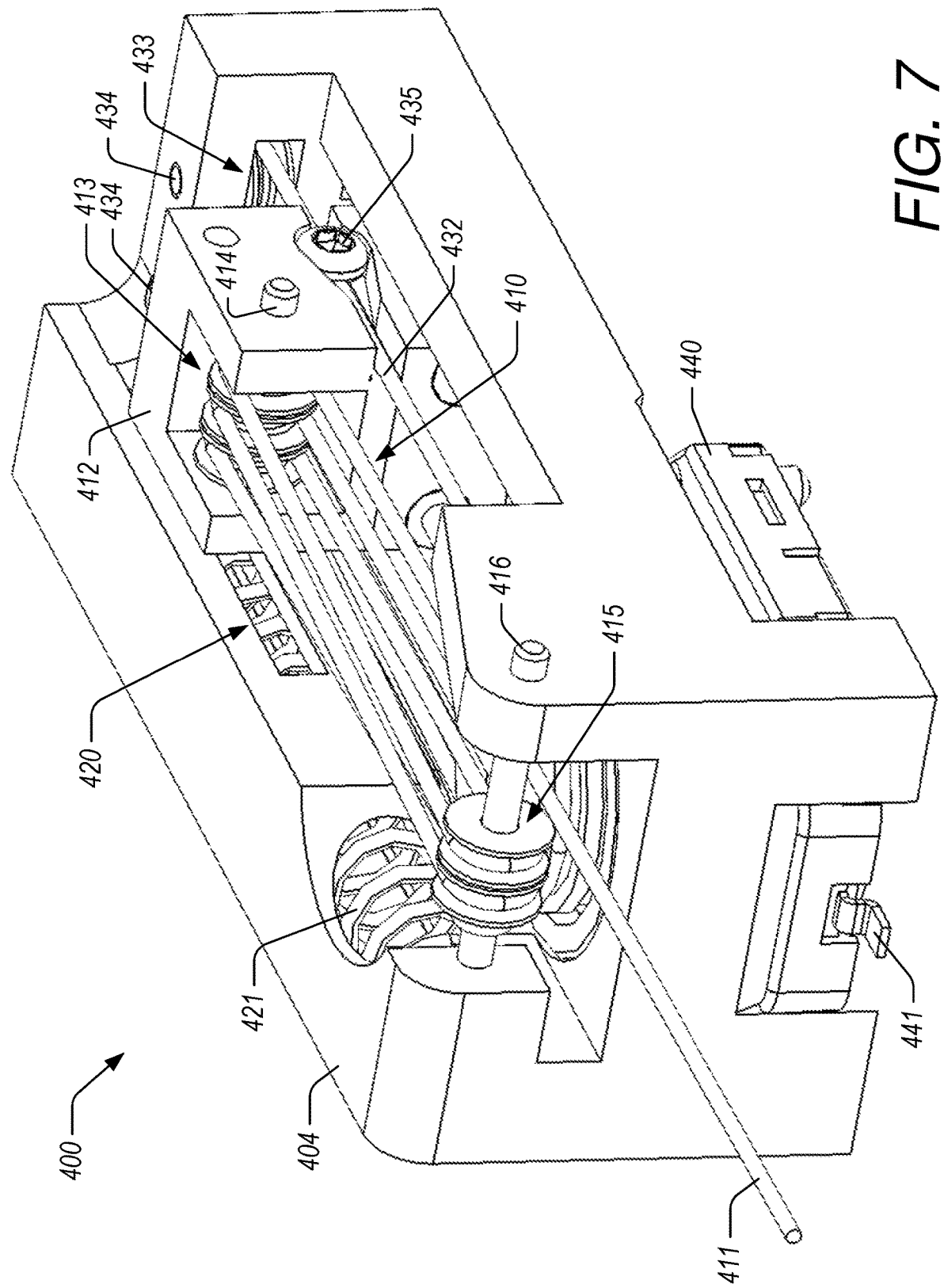
FIG. 7 illustrates another example embodiment of a cable-actuated position sensor.

FIGS. 7, 8A, 8B, and 8C illustrate another example embodiment of a cable-actuated position sensor 400. FIG. 7 illustrates the sensor 400 without a housing, as illustrated for the sensor 100 in FIG. 1A, however it is to be understood that the sensor 400 can include a housing similar to the housing 102 described herein with reference to FIG. 1A. The sensor 400 is similar to the sensor 100, the sensor 200, and the sensor 300 described herein with reference to FIGS. 1A-6D except that the sensor 400 includes a compression spring system 420 rather than a spring pulley system. This presents certain advantages, such as improved durability and/or reliability relative to an extension spring system due at least in part to the removal of components such as the string connecting the extension spring to the fixed block. Removal of components can typically improve reliability due at least in part to there being fewer components that may fail or wear out over time. Another advantage may be in reduced costs of manufacturing due at least in part to fewer components. For example, using the compression spring removes two pulleys from the sensor and some labor associated with assembling the extension spring which may provide some cost advantages.

Similar to the sensor 100, the sensor 200, and the sensor 300, the sensor 400 includes a measurement pulley system 410 that includes a block and tackle configuration that includes a movable block 410 with a movable block dowel 414 supporting a plurality of movable block pulleys 413. The measurement pulley system 410 also includes a plurality of proximal pulleys 415 supported by a proximal dowel 416. A flexible cable 411 is threaded through the proximal pulleys 415 and the movable block pulleys 413. The sensor 400 includes guide rails 418 supported by the assembly plate 404, the guide rails 418 configured to facilitate proximal and distal movement of the movable block 412. The sensor 400 includes a coupler pulley 431 that converts linear movement of the movable block 412 into rotational movement of a component of a rotational sensor 440. The sensor 400 includes a coupler pulley system 430 that includes the coupler pulley 431, a coupler cable 432, coupler cable pulleys 433, coupler dowels 434, and a coupler cable anchor 435. The coupler cable 432 is wrapped around and through an upper portion of the coupler pulley 431. The coupler cable 432 is also anchored to the movable block 412 using the coupler cable anchor 435. Translation of the movable block 412 causes the coupler cable anchor 435 to move which in turn causes the coupler cable 432 to move along a circuitous path from the cable anchor 435 around and through the upper portion of the coupler pulley 431 around a pair of coupler cable pulleys 433 and back to the coupler cable anchor 435. The coupler cable pulleys 433 are secured to respective coupler dowels 434. The coupler dowels 434 are secured to the assembly plate 404. The circuitous path of the coupler cable 432 causes the coupler pulley 431 to rotate when the movable block 412 moves back and forth along the guide rails 418.

The sensor 400 includes the compression spring system 420 that includes a compression spring 421 and a compression dowel 427 coupled to the movable block 412. Proximal movement of the movable block 412 causes the compression dowel to compress the compression spring 421. When the compression spring 421 is compressed, it exerts a distal or restoring force on the movable block 412 tending to move it to its original or starting position. Notably, because the sensor 400 uses the compression spring system 420 rather than a spring pulley system, the sensor 400 does not include spring pulleys and associated cables. Instead, the sensor 400 uses the compression dowel 427 so that proximal movement of the movable block 412 results in compression of the compression spring 421 and a resultant distal or restoring force on the movable block 412. Compression of the compression spring 421 is caused by the interaction between the compression dowel 427 and the compression spring 421 when the movable block 412 slides proximally.

Figure 8A:
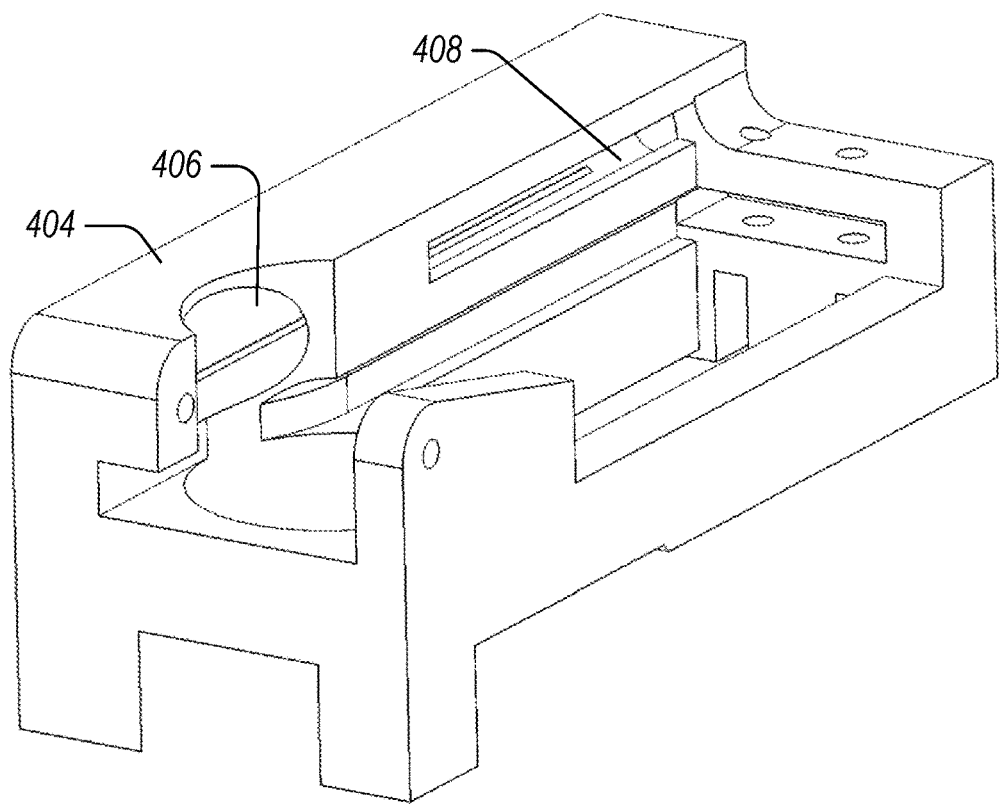
FIGS. 8A, 8B, and 8C illustrate additional views of the cable-actuated position sensor of FIG. 7.
Figure 8B:
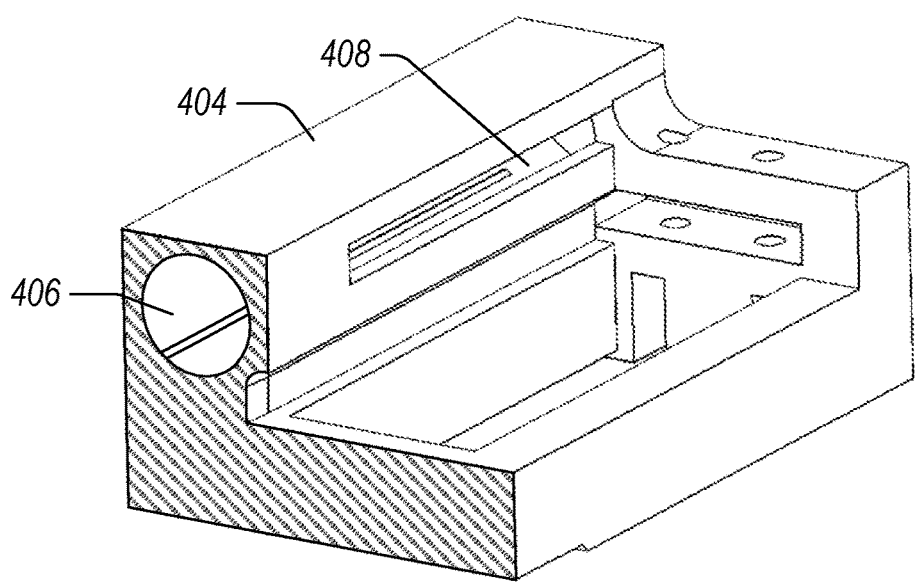
Figure 8C:
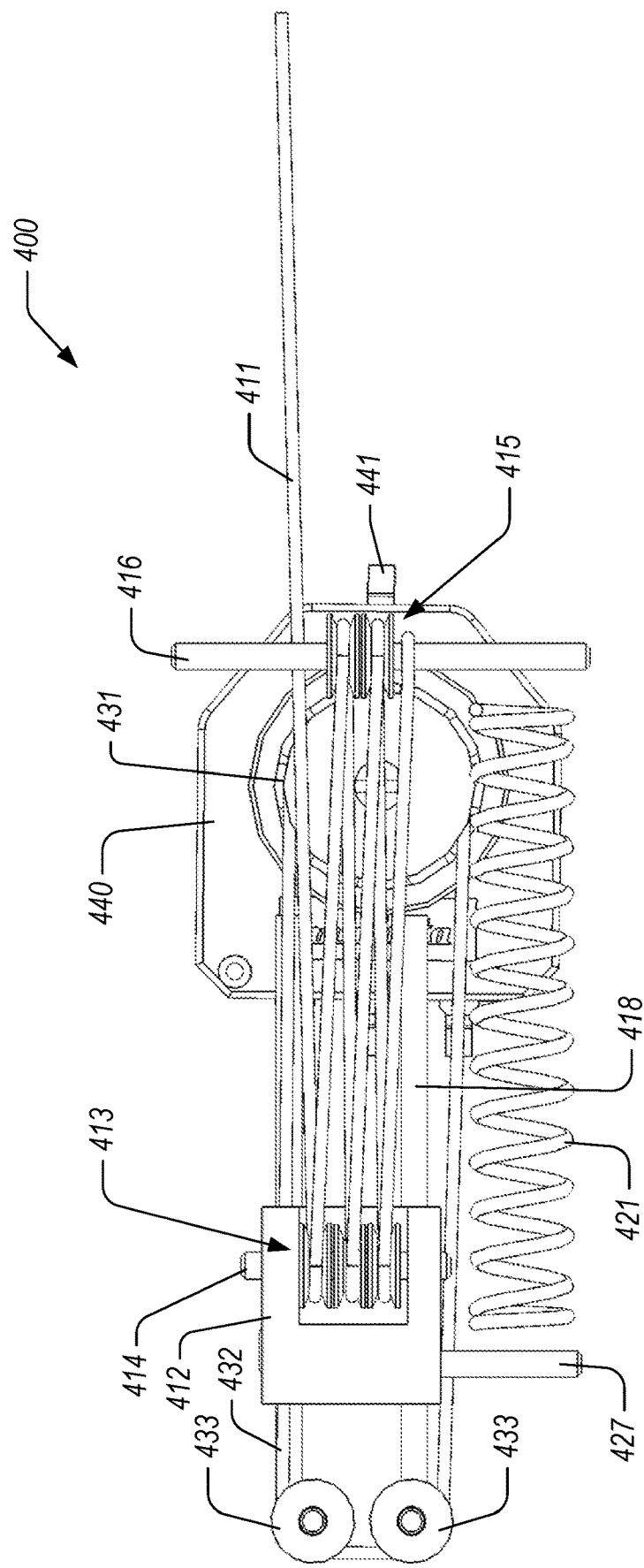

FIGS. 8A and 8B respectively illustrate an elevated view and a cross-section of the assembly plate 404. The assembly plate 404 forms a spring lumen 406 and a dowel notch 408. The spring lumen is configured to house the compression spring 421 to allow longitudinal compression and decompression of the compression spring 421 while restricting any lateral movement. The dowel notch 408 is configured to allow the compression dowel 427 to contact and to operably couple to a distal end of the compression spring 427. The dowel notch 408 is also configured to allow proximal and distal movement of the compression dowel 427 resulting from corresponding movement of the movable block 412 to which it is attached.

In some embodiments, the sensor 400 includes a dual compression spring system, similar to the dual spring system of the sensor 200. In such embodiments, the assembly plate 404 can include dual spring lumens 406 that each house compression springs on opposite sides of the assembly plate 404. Such embodiments may advantageously provide additional force and/or reliability for the sensor 400. This allows additional pulleys to be utilized on the movable block resulting in longer extension or displacement measurement capabilities without increasing the size (e.g., the length) of the sensor 400. It is to be understood, however, that adding pulleys may increase the width of the sensor 400.

Block Diagram of an Example Measurement Apparatus

Figure 9:
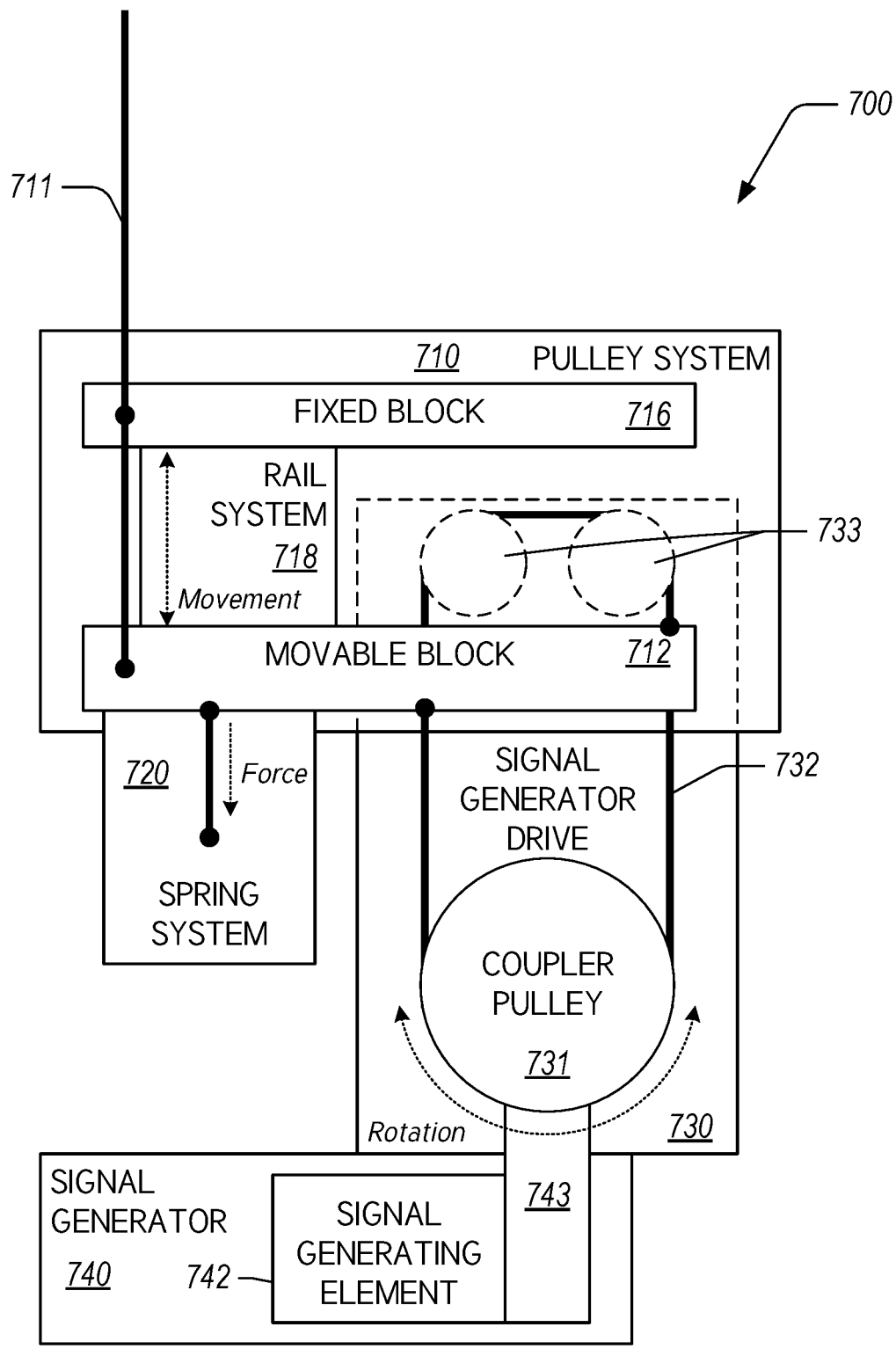
FIG. 9 illustrates a block diagram of an example apparatus for measuring distances, such as the cable-actuated position sensors of FIGS. 1A-8C.

FIG. 9 illustrates a block diagram of an example apparatus 700 for measuring distances, such as the cable-actuated position sensors described herein. The apparatus 700 includes an extensible element 711 (e.g., a cable, filament, string, thread, etc.) that is operably coupled to a pulley system 710. The pulley system includes a fixed block 716 and a movable block 712. The movable block 712 is configured to move along a rail system 718. The pulley system 710 is in a block and tackle configuration with one or more pulleys secured to the fixed block 716 and one or more pulleys secured to the movable block 712. Extending the extensible element 711 causes the movable block 712 to approach the fixed block 716 (e.g., moving proximally), guided by the rail system 718. Movement of the movable block 712 away from the fixed block 716 (e.g., moving distally) causes the extensible element 711 to retract, being wound around pulleys of the pulley system 710.

The apparatus 700 also includes a spring system 720 configured to apply a force to the movable block 712 in a direction opposite of the pull on the extensible element 711. This force tends to cause the movable block 712 to move away from the fixed block 716 to un-collapse or increase the distance between the movable block 712 and the fixed block 716 when force is reduced or removed from the extensible element 711. This can effectively pull a portion of the extensible element 711 back into the pulley system 710. The spring system 720 can include, for example and without limitation, an extension spring, compression spring, flat constant force spring, or the like.

The apparatus 700 includes a signal generator drive 730 that includes a coupler pulley 731, a flexible coupling filament 732, and one or more coupling filament pulleys 733. The coupler pulley 731 is operably coupled to the movable block 712 through the flexible coupling filament 732. The flexible coupling filament 732 can be attached to the movable block 712 at one or more places to form a closed loop so that movement of the movable block 712 is converted into rotation of the coupler pulley 731.

In operation, the movable block 712 is moved along the rail system 718 as the extensible element 711 is pulled through the pulley system 710, thereby collapsing or decreasing the distance between the fixed block 716 and the movable block 712. The flexible coupling filament 732 passes through the coupler pulley 731 and makes one or more wraps around the coupler pulley 731 and then passes around one or more coupling filament pulleys 733 to connect with the movable block 712 to form a loop that locks the linear position of the movable block 712 to the rotational position of the coupler pulley 731. Thus, movement of the movable block 712 causes the coupler pulley 731 to rotate.

The apparatus 700 also includes a signal generator 740 that generates an output signal corresponding to the displacement and/or velocity of the extensible element 711. The signal generator 740 is operably coupled to the movable block 712 by way of a rotatable shaft 743 that is coupled to the coupler pulley 731. The rotatable shaft 743 is coupled to a signal generating element 742 that generates an electrical signal in response to rotation of the rotatable shaft 743. Thus, because the coupler pulley 731 is coupled to the rotatable shaft 743 and to the movable block 712 by way of the flexible coupling filament 732, movement or displacement of the movable block 712 causes the signal generator 740 to provide an electrical signal. This output signal can be configured to vary in a linear relation to the movable block 712 along the rail system 718. In some embodiments, the signal generator 740 includes a single- or multi-turn linear potentiometer.

Example Servo Motors with Position Sensors

Figure 10:
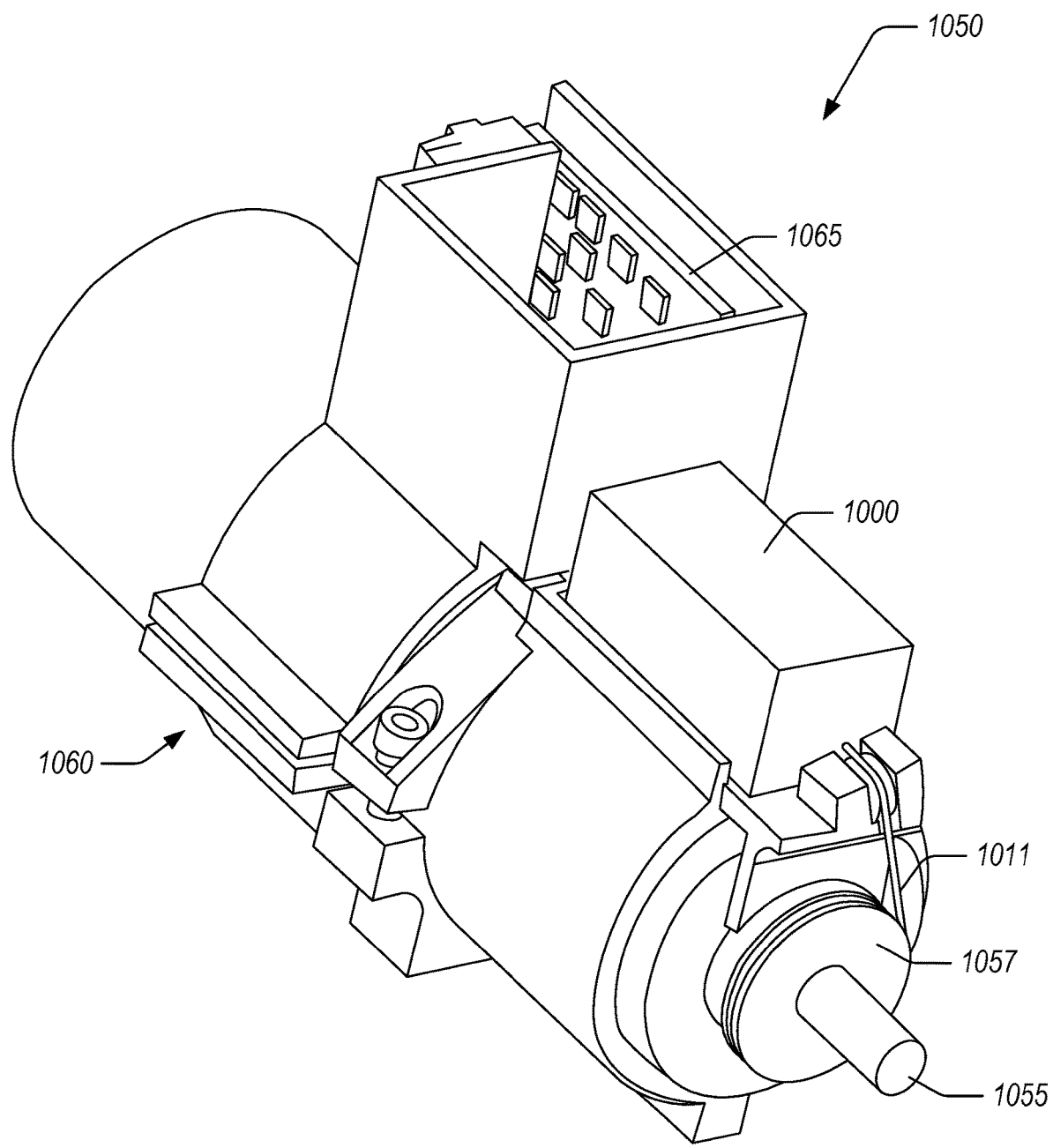
FIG. 10 illustrates an example gear motor with a coupled cable actuated position sensor.
Figure 11:
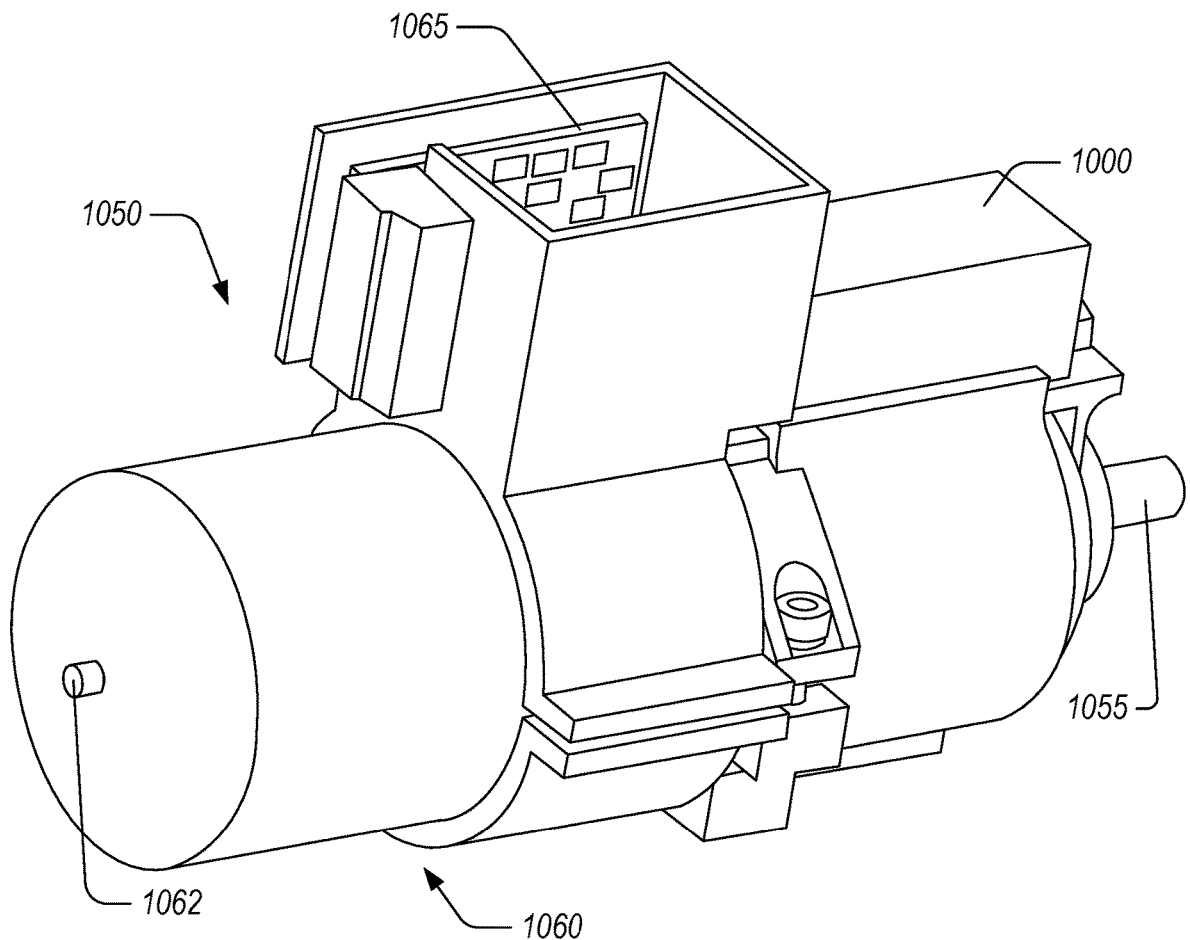
FIG. 11 illustrates a motor shaft of the gear motor of FIG. 10.
Figure 12:
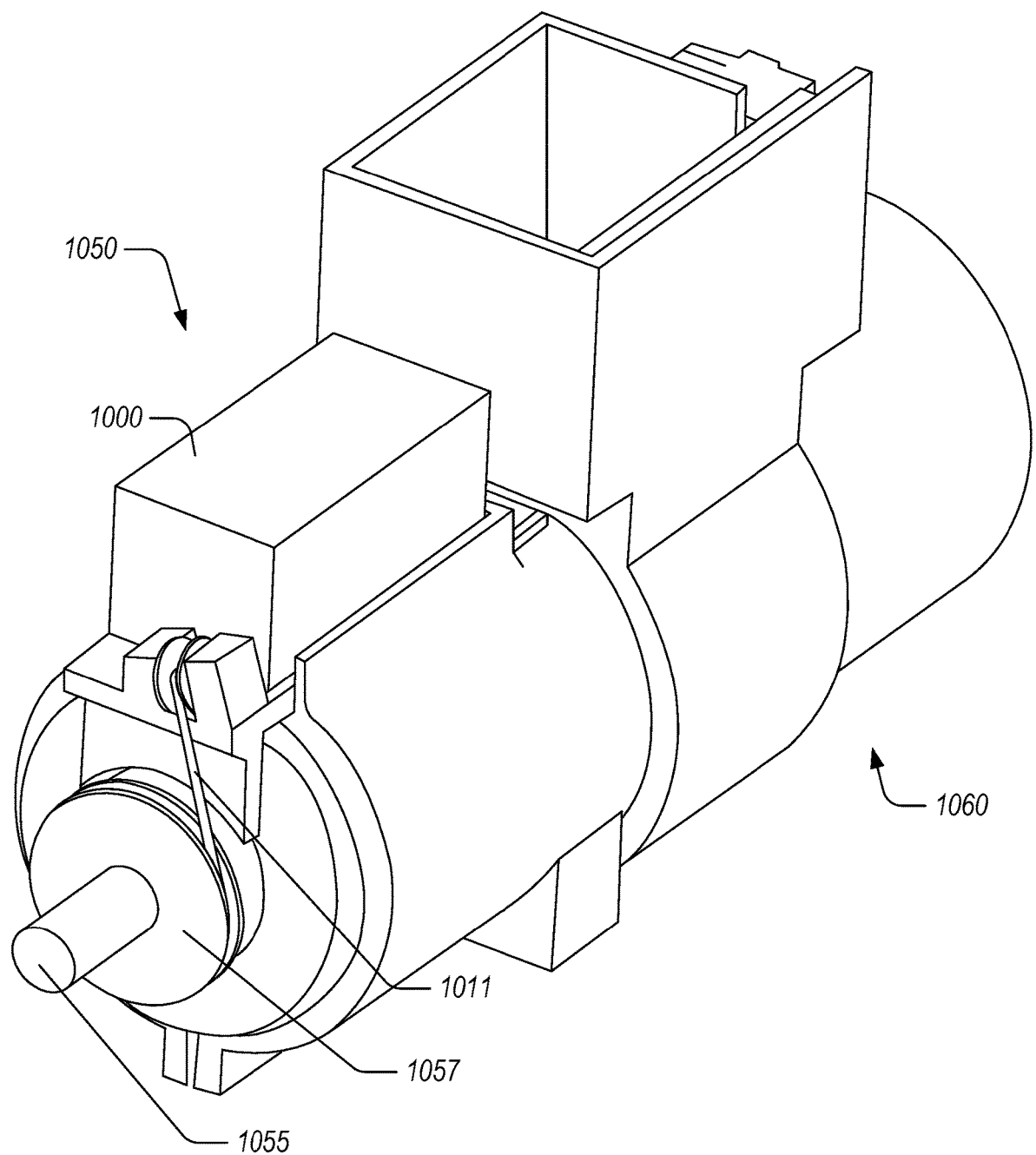
FIG. 12 illustrates an output shaft of the gear motor of FIG. 10.

FIGS. 10-12 illustrate an example embodiment of a gear motor 1050 with a cable-actuated position sensor 1000 to provide feedback regarding the position, velocity, and/or acceleration of an output shaft 1055 of the gear motor 1050. The cable actuated position sensor 1000 can be any of the cable actuated position sensors described herein with reference to FIGS. 1A-9. The gear motor 1050 with the cable-actuated position sensor 1000 can act as a servo motor. A servo motor is a small device that typically incorporates a motor (e.g., a DC motor or an AC motor), a gear train, a potentiometer, an integrated circuit, and an output shaft. The output shaft of the servo can be positioned to specific angular positions by sending a coded signal. Thus, the gear motor 1050 can be a servo motor where the cable-actuated position sensor 1000 provides feedback to circuitry 1065 of the gear motor 1050 to control the angular position, velocity, and/or acceleration of the output shaft 1055.

The gear motor 1050 includes a motor unit 1060 with a motor shaft 1062. The motor shaft 1062 is coupled to the output shaft 1055 using one or more gears. The one or more gears causes multiple rotations of the motor shaft 1062 to result in a single rotation of the output shaft 1055. The gear motor 1050 includes the cable actuated position sensor 1000 coupled to the output shaft 1055, wherein rotation of the output shaft 1055 causes a cable 1011 of the cable actuated position sensor 1000 to be withdrawn from or retracted into the sensor 1000. The gear motor includes circuitry 1065 configured to receive a signal from the cable actuated position sensor 1000. In some embodiments, the sensor 1000 is configured to provide a signal corresponding to a linear displacement of the cable 1011. In some embodiments, the sensor 1000 is configured to provide a signal corresponding to a rotational angle of the output shaft 1055. In some embodiments, the circuitry 1065 is further configured to generate a signal corresponding to an absolute position of the output shaft 1055 based on the signal received from the sensor 1000. In some embodiments, the circuitry 1065 is further configured to provide control of the absolute position or rotational angle of the output shaft 1055 based on the signal received from the sensor 1000.

The circuitry 1065 can be built into the motor unit 1060. The circuitry 1065 is electrically coupled to a motor in the motor unit 1060. The motor is configured to cause the motor shaft 1062 to rotate and, through the one or more gears coupled to the motor shaft 1062, to cause the output shaft 1055 to rotate. The motor can be controlled with an electric signal which determines the amount of movement of the output shaft 1055. When the output shaft 1055 of the gear motor 1050 is at the desired or targeted position, as determined using feedback from the position sensor 1000, power supplied to the motor can be stopped. Otherwise, using feedback from the position sensor 1000, the circuitry 1065 determines the direction to turn the motor to cause the output shaft 1055 to turn to the right position. Likewise, angular velocity and/or angular acceleration of the output shaft 1055 can be controlled in a similar fashion using signals from the position sensor 1000 as feedback. In some embodiments, the gear motor 1050 utilizes proportional control using feedback from the position sensor 1000. Proportional control includes controlling the speed of the output shaft 1055 based at least in part on the difference between its actual position and a targeted position. In such embodiments, when the output shaft 1055 is near the targeted position, it will turn slowly, otherwise it will turn fast.

The cable actuated position sensor 1000 is coupled to the output shaft 1055 of the gear motor 1050 by connecting the cable 1011 to a pulley 1057 on the output shaft 1055. As the output shaft 1055 rotates, the cable 1011 of the sensor 1000 winds or unwinds around the pulley 1057, transferring the rotary motion of the output shaft 1055 to linear motion of the cable 1011. The output signal of the cable actuated position sensor 1000 is then used to track and to control the position, speed, and/or acceleration of the output shaft 1055 without needing to track the position or rotation of the motor shaft 1062.

Connecting the cable actuated position sensor 1000 directly to the output shaft 1055 of the gear motor 1050 provides a number of advantages. One advantage is that the gear motor 1050 that measures rotation of the output shaft 1055 is less complex than a servo motor that tracks the position of the motor shaft 1062. Another advantage is that the gear motor 1050 with a cable actuated position sensor 1000 coupled to the output shaft 1055 provides absolute position sensing which is advantageous over servo motors that can only provide relative position sensing.

First, the gear motor 1050 may be advantageous over servo motors that use position sensors to track rotation of the motor shaft because the gear motor 1050 tracks the rotation of the output shaft 1055. Servo motors that track the position or rotation of the motor shaft may provide a high degree of accuracy in the output shaft position but with the tradeoff of additional system complexity. In typical servo systems, the position sensor or encoder is connected to the motor shaft and must keep track of large numbers of motor shaft rotations for a single turn of the output shaft. For motors with high gear ratios the motor may need to spin very fast. The faster the motor spins the more difficult it can be to track the position. Furthermore, high speed motors mean high frequency encoder pulses that may lead to complex electronics and more processing power. All of these factors contribute to increases in servo motor cost and complexity. In contrast, the gear motor 1050 directly tracks the position, speed, and/or acceleration of the output shaft 1055 using the position sensor 1000. This reduces cost and complexity of the gear motor 1050.

Second, the gear motor 1050 provides absolute position sensing that may be advantageous over servo motors that employ a relative position sensor or encoder. An issue created by the large number of motor shaft rotations relative to the small number of output shaft rotations is the need for a relative position sensor or encoder. It is impractical to track the absolute position of the motor shaft over hundreds or thousands of rotations. Consequently, typical servo motors utilize a relative sensor or encoder. A relative sensor is not capable of providing the exact position or angle of the output shaft without an initial reference point. As a result, each time the system is powered on the actual position or angle of the output shaft must be determined (e.g., by moving the output shaft to a known location to determine the initial reference point). This could be problematic if there are numerous servos that need this initial calibration or if the system design makes this difficult to accomplish. By connecting the sensor 1000 directly to the output shaft 1055 of the gear motor 1050, the number of rotations of the output shaft 1055 that needs to be tracked is greatly diminished and the use of absolute position sensing is possible. Advantageously, with absolute position sensing there is no need to determine the actual position or angle of the output shaft 1055 upon power up because the sensor 1000 provides the actual position and operation of the gear motor 1050 can begin immediately. System complexity is also decreased with absolute position sensing since additional hardware and software is not needed to interface with the relative position encoder and the sensors and software needed to determine the initial position are unnecessary.

The gear motor 1050 uses the cable actuated position sensor 1000 coupled to the output shaft 1050 of an inexpensive gear motor. The signal from the position sensor 1000 is read by the on-board electronics 1065 and is used to control the position or angle of the output shaft 1055 based on a control signal. To reduce cost and complexity, the onboard electronics 1065 can accept common, easily produced control signals like pulse width modulation (PWM) or analog voltages. Digital interfaces like RS-232, SPI or I2C could also be implemented for higher end applications. This enables off-the-shelf components, such as an Arduino board, and simple software to be used to create projects or products that bring a relatively high level of functionality at a relatively low cost.

In some embodiments, a gear motor 1050 can be converted to a servo motor using the cable actuated position sensor 1000. In such embodiments, a conversion kit can be used to attach the sensor 1000 to an existing gear motor. The electrical signals from the cable actuated position sensor 1000 can be used as feedback to control the position, speed, and/or acceleration of the output shaft 1055.

The gear motor 1050 can be used in a variety of applications. For example, the gear motor 1050 can be used to operate remote-controlled devices, radio-controlled devices, robots, vehicles and the like and can be used in industrial applications, robotics, in-line manufacturing, pharmaceutics, and food services.

Block Diagram of an Example Measurement Apparatus

Figure 13:
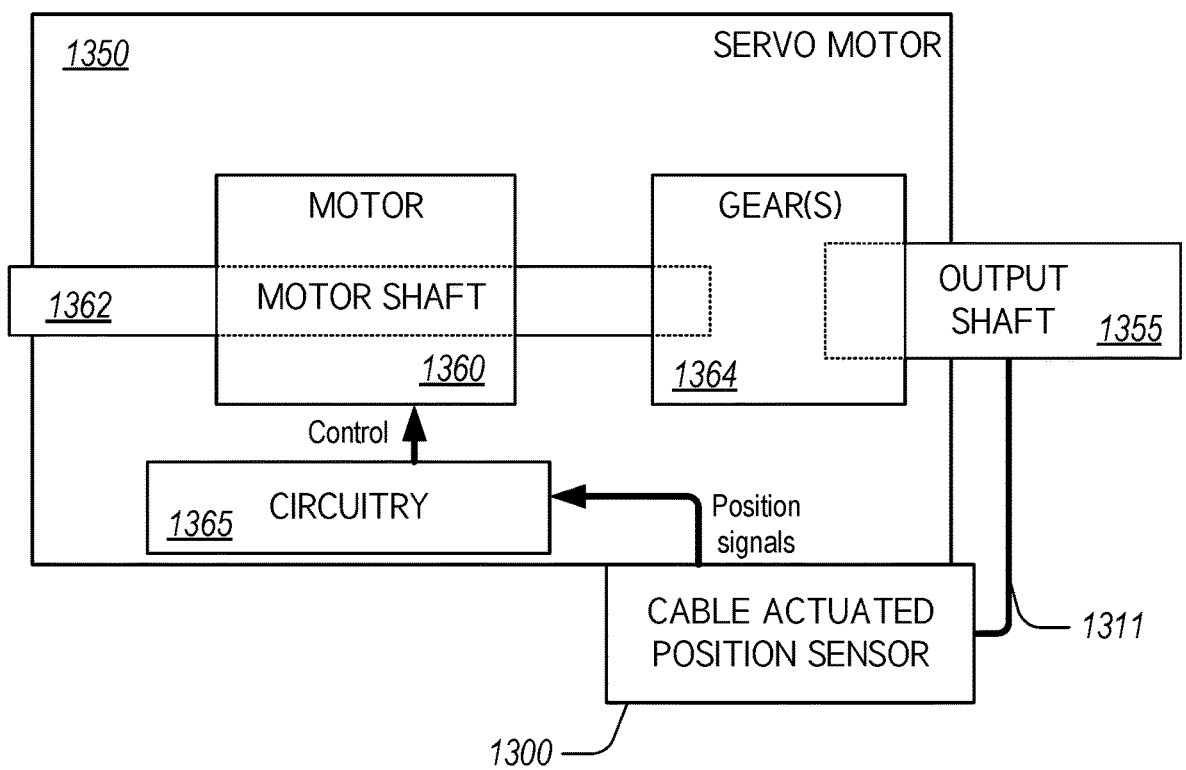
FIG. 13 illustrates a block diagram of an example servo motor utilizing a cable-actuated position sensor.

FIG. 13 illustrates a block diagram of an example servo motor 1350 utilizing a cable-actuated position sensor 1300, such as the position sensors described herein with reference to FIGS. 1A-9. The servo motor 1350 includes a gear motor 1360 with a motor shaft 1362. The servo motor 1350 includes an output shaft 1355. The servo motor 1350 includes one or more gears 1364 coupled to the motor shaft 1362 and to the output shaft 1355. The one or more gears 1364 are configures to that multiple rotations of the motor shaft 1362 results in a single rotation of the output shaft 1355. In some embodiments, the ratio of rotations of the motor shaft 1362 to rotations of the output shaft 1355 can be at least 2:1, at least 10:1, at least 100:1, or at least 1000:1. The servo motor 1350 includes the cable actuated position sensor 1300 coupled to the output shaft 1355. Rotation of the output shaft 1355 causes a cable 1311 of the cable actuated position sensor 1300 to be withdrawn from or retracted into the sensor 1300. The cable 1311 can be any suitable extensible element (e.g., a cable, filament, string, thread, etc.) that is operably coupled to the output shaft 1355. The servo motor 1350 includes circuitry 1365 configured to receive a signal from the cable actuated position sensor 1300.

In some embodiments, the position sensor 1300 is configured to provide a signal corresponding to a linear displacement of the cable 1311. In some embodiments, the position sensor 1300 is configured to provide a signal corresponding to a rotational angle of the output shaft 1355. In some embodiments, the circuitry 1365 is further configured to generate an absolute position of the output shaft 1355 based on the signal received from the position sensor 1300. In some embodiments, the circuitry 1365 is further configured to provide control of the absolute position or rotational angle of the output shaft 1355 based on the signal received from the sensor.

Numbered Example Embodiments

The following is a numbered list of example embodiments. The numbered embodiments are intended to delineate certain combinations of elements without intending to limit the scope of the disclosure to these certain combinations. Accordingly, the below embodiments should be understood to be exemplary rather than a complete list of potential combinations of elements.

1. A cable-actuated position sensor comprising:
   a measurement pulley system having a block and tackle configuration with a fixed block and a movable block, the measurement pulley system including a measurement cable that passes through one or more pulleys of the fixed block and one or more pulleys of the movable block such that distal movement of the measurement cable causes the movable block to approach the fixed block;
   a rail system configured to direct movement of the movable block in a proximal and distal direction, the movable block operably coupled to the rail system;
   a spring system coupled to the movable block and configured to provide a distal force in response to proximal movement of the movable block;
   a coupler pulley system having a coupler pulley and a coupler cable coupled to the coupler pulley and attached to the movable block, the coupler pulley system configured to convert linear movement of the movable block into rotational movement of the coupler pulley; and
   a rotational sensor operably coupled to the coupler pulley such that rotational movement of the coupler pulley causes the rotational sensor to generate an output signal correlated to a displacement of the movable block.

2. The sensor of embodiment 1 further comprising an assembly plate configured to support the measurement pulley system, the rail system, the spring system, the coupler pulley system, and the rotational sensor.

3. The sensor of embodiment 2 further comprising a housing configured to support the assembly plate.

4. The sensor of embodiment 1 wherein the rail system includes a single rail that passes through a corresponding conduit of the movable block.

5. The sensor of embodiment 1 wherein the rail system includes two or more rails that pass through corresponding conduits of the movable block.

6. The sensor of embodiment 1 wherein the rail system includes a linear guide formed by an assembly plate that supports one or more of the measurement pulley system, the rail system, the spring system, the coupler pulley system, and the rotational sensor.

7. The sensor of embodiment 6 wherein the movable block includes feet that form a cavity that conforms to a cross-section of the linear guide.

8. The sensor of embodiment 1 wherein the spring system includes a constant force spring coupled to the movable block at a spring anchor.

9. The sensor of embodiment 1 wherein the spring system includes an extension spring operably coupled to the movable block through a spring cable attached to the movable block and to the extension spring.

10. The sensor of embodiment 9 further comprising a second extension spring operably coupled to the movable block through a second spring cable attached to the movable block and to the second extension spring.

11. The sensor of embodiment 9 wherein the spring system further includes a spring pulley system that redirects a proximal force exerted by the extension spring to a distal force applied on the movable block.

12. The sensor of embodiment 1 wherein the spring system includes a compression spring operably coupled to the movable block through a compression dowel attached to the movable block and operably coupled to the compression spring.

13. The sensor of embodiment 12 further comprising an assembly plate forming a spring lumen to house the compression spring.

14. The sensor of embodiment 1 wherein the coupler cable forms a closed loop that locks the displacement of the movable block to a rotational position of the coupler pulley.

15. The sensor of embodiment 1 wherein the rotational sensor further includes a rotating component coupled to the coupler pulley such that rotation of the coupler pulley causes the rotating component to rotate.

16. The sensor of embodiment 15 wherein rotation of the rotating component causes a change in the output signal of the rotational sensor.

17. The sensor of embodiment 1 wherein the output signal of the rotational sensor is proportional to the displacement of the movable block.

18. The sensor of embodiment 1 wherein the spring system is attached to the fixed block.

19. The sensor of embodiment 1 wherein the coupler pulley system further includes a coupler cable pulley configured to route the coupler cable from a distal side of the movable block to a proximal side of the movable block to form a closed loop.

20. The sensor of embodiment 1 wherein the sensor is configured to measure displacements up to 20 inches.

21. A gear motor comprising:
a gear motor with a motor shaft;
an output shaft;
one or more gears coupled to the motor shaft and to the output shaft to cause multiple rotations of the motor shaft to result in a single rotation of the output shaft;
a cable actuated position sensor coupled to the output shaft, wherein rotation of the output shaft causes a cable of the cable actuated position sensor to be withdrawn from or retracted into the sensor; and
circuitry configured to receive a signal from the cable actuated position sensor.

22. The gear motor of embodiment 21 wherein the sensor is configured to provide a signal corresponding to a linear displacement of the cable.

23. The gear motor of embodiment 21 wherein the sensor is configured to provide a signal corresponding to a rotational angle of the output shaft.

24. The gear motor of embodiment 21 wherein the circuitry is further configured to generate an absolute position of the output shaft based on the signal received from the sensor.

25. The gear motor of embodiment 21 wherein the circuitry is further configured to provide control of the absolute position or rotational angle of the output shaft based on the signal received from the sensor.

26. The gear motor of embodiment 21 wherein the cable actuated position sensor is any of the cable actuated position sensors of embodiments 1-20.

Terminology and Additional Embodiments

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill and are intended to form a part of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:
1. A cable-actuated position sensor comprising:
a measurement pulley system having a block and tackle configuration with a fixed block and a movable block, the measurement pulley system including a measurement cable that passes through one or more pulleys of the fixed block and one or more pulleys of the movable block such that distal movement of the measurement cable causes the movable block to approach the fixed block;
a rail system configured to direct movement of the movable block in a proximal and distal direction, the movable block operably coupled to the rail system;
a spring system coupled to the movable block and configured to provide a distal force in response to proximal movement of the movable block;
a coupler pulley system having a coupler pulley and a coupler cable coupled to the coupler pulley and attached to the movable block, the coupler pulley system configured to convert linear movement of the movable block into rotational movement of the coupler pulley; and a rotational sensor operably coupled to the coupler pulley such that rotational movement of the coupler pulley causes the rotational sensor to generate an output signal correlated to a displacement of the movable block.

2. The sensor of claim 1 further comprising an assembly plate configured to support the measurement pulley system, the rail system, the spring system, the coupler pulley system, and the rotational sensor.

3. The sensor of claim 2 further comprising a housing configured to support the assembly plate.

4. The sensor of claim 1 wherein the rail system includes a single rail that passes through a corresponding conduit of the movable block.

5. The sensor of claim 1 wherein the rail system includes two or more rails that pass through corresponding conduits of the movable block.

6. The sensor of claim 1 wherein the spring system includes a constant force spring coupled to the movable block at a spring anchor.

7. The sensor of claim 1 wherein the spring system includes an extension spring operably coupled to the movable block through a spring cable attached to the movable block and to the extension spring.

8. The sensor of claim 7 further comprising a second extension spring operably coupled to the movable block through a second spring cable attached to the movable block and to the second extension spring.

9. The sensor of claim 7 wherein the spring system further includes a spring pulley system that redirects a proximal force exerted by the extension spring to a distal force applied on the movable block.

10. The sensor of claim 1 wherein the spring system includes a compression spring operably coupled to the movable block through a compression dowel attached to the movable block and operably coupled to the compression spring.

11. The sensor of claim 10 further comprising an assembly plate forming a spring lumen to house the compression spring.

12. The sensor of claim 1 wherein the coupler cable forms a closed loop that locks the displacement of the movable block to a rotational position of the coupler pulley.

13. The sensor of claim 1 wherein the rotational sensor further includes a rotating component coupled to the coupler pulley such that rotation of the coupler pulley causes the rotating component to rotate.

14. The sensor of claim 1 wherein the spring system is attached to the fixed block.

15. The sensor of claim 1 wherein the coupler pulley system further includes a coupler cable pulley configured to route the coupler cable from a distal side of the movable block to a proximal side of the movable block to form a closed loop.

* * * * *